(12) United States Patent
Ozu et al.

(10) Patent No.: US 8,523,451 B2
(45) Date of Patent: Sep. 3, 2013

(54) ROLLER BEARING

(75) Inventors: Takuya Ozu, Mie (JP); Naoki Matsumori, Mie (JP)

(73) Assignee: NTN Corporation, Osaka (JP)

( * ) Notice: Subject to any disclaimer, the term of this patent is extended or adjusted under 35 U.S.C. 154(b) by 703 days.

(21) Appl. No.: 11/991,018

(22) PCT Filed: Aug. 31, 2006

(86) PCT No.: PCT/JP2006/317280
§ 371 (c)(1),
(2), (4) Date: Jan. 26, 2009

(87) PCT Pub. No.: WO2007/026851
PCT Pub. Date: Mar. 8, 2007

(65) Prior Publication Data
US 2009/0252448 A1 Oct. 8, 2009

(30) Foreign Application Priority Data

Sep. 1, 2005 (JP) ................... 2005-253746
Dec. 16, 2005 (JP) ................... 2005-363799
Dec. 28, 2005 (JP) ................... 2005-377689
Mar. 3, 2006 (JP) ................... 2006-058137

(51) Int. Cl.
*F16C 19/40* (2006.01)
(52) U.S. Cl.
USPC ........................................ 384/551; 384/574
(58) Field of Classification Search
USPC .............. 384/44, 51, 551, 572–580
See application file for complete search history.

(56) References Cited

U.S. PATENT DOCUMENTS

| | | | | |
|---|---|---|---|---|
| 184,242 A | * | 11/1876 | Haynes | 384/574 |
| 1,871,149 A | * | 8/1932 | Brown | 384/574 |
| 3,292,981 A | | 12/1966 | Zaúgg | |
| 3,552,814 A | * | 1/1971 | Altson et al. | 384/574 |
| 3,586,407 A | * | 6/1971 | Schweitzer | 384/574 |
| 3,606,504 A | * | 9/1971 | Wojciechowski | 384/551 |
| 3,659,912 A | * | 5/1972 | Scheifele | 384/575 |
| 3,964,802 A | | 6/1976 | Pitner | |

(Continued)

FOREIGN PATENT DOCUMENTS

| | | |
|---|---|---|
| DE | 102 46 825 | 4/2004 |
| EP | 0 164 968 | 12/1985 |

(Continued)

OTHER PUBLICATIONS

Supplementary European Search Report dated Nov. 5, 2009 in corresponding European Application No. 06797240.

(Continued)

*Primary Examiner* — Victor MacArthur
*Assistant Examiner* — Matthew R McMahon
(74) *Attorney, Agent, or Firm* — Wenderoth, Lind & Ponack, L.L.P.

(57) ABSTRACT

A roller bearing has spacers interposed between its rollers. The roller bearing also has a high permissible rotational speed which is achieved by allowing a lubricant to flow smoothly around rolling surfaces so that the stirring resistance of the lubricant due to the spacers is reduced. The roller bearing includes a plurality of rotatable rollers interposed between an inner ring raceway surface and an outer ring raceway surface and spacers provided between adjacent rollers. Each of the spacers includes extended portions facing roller end faces of the rollers at both axial ends thereof.

21 Claims, 26 Drawing Sheets

(56) References Cited

U.S. PATENT DOCUMENTS

| | | | |
|---|---|---|---|
| 4,003,609 A * | 1/1977 | Juhas | 384/574 |
| 4,345,800 A * | 8/1982 | Hofmann et al. | 384/450 |
| 5,123,756 A | 6/1992 | Amen et al. | |
| 5,597,243 A | 1/1997 | Kaiser et al. | |
| 6,347,558 B1 * | 2/2002 | Miyaguchi et al. | 74/424.71 |
| 6,513,987 B2 * | 2/2003 | Takahashi et al. | 384/574 |
| 6,709,158 B2 * | 3/2004 | Ishihara | 384/44 |
| 6,821,604 B2 * | 11/2004 | Kasuga et al. | 428/156 |
| 6,997,078 B2 * | 2/2006 | Okita et al. | 74/424.88 |
| 7,458,722 B2 * | 12/2008 | Chen et al. | 384/51 |
| 7,938,585 B2 * | 5/2011 | Hofmann et al. | 384/574 |
| 2001/0007685 A1 | 7/2001 | Kasuga et al. | |
| 2003/0223667 A1 * | 12/2003 | Leibowitz | 384/574 |
| 2004/0190801 A1 | 9/2004 | Kato et al. | |
| 2004/0213485 A1 | 10/2004 | Kato et al. | |
| 2004/0228560 A1 * | 11/2004 | Kuo | 384/521 |
| 2006/0204158 A1 * | 9/2006 | Kobayashi et al. | 384/574 |
| 2006/0262999 A1 * | 11/2006 | Kurachi et al. | 384/51 |

FOREIGN PATENT DOCUMENTS

| | | |
|---|---|---|
| EP | 1 408 248 | 4/2004 |
| EP | 1 457 693 | 9/2004 |
| JP | 48-104943 | 12/1973 |
| JP | 54-93646 | 7/1979 |
| JP | 60-263726 | 12/1985 |
| JP | 03-213720 | 9/1991 |
| JP | 06-058334 | 3/1994 |
| JP | 07-004429 | 1/1995 |
| JP | 08-502576 | 3/1996 |
| JP | 8-270658 | 10/1996 |
| JP | 08-303466 | 11/1996 |
| JP | 09-242759 | 9/1997 |
| JP | 10-184693 | 7/1998 |
| JP | 11-280769 | 10/1999 |
| JP | 2000-320548 | 11/2000 |
| JP | 2001-193740 | 7/2001 |
| JP | 2002-188643 | 7/2002 |
| JP | 2003-97592 | 4/2003 |
| JP | 2003-139142 | 5/2003 |
| JP | 2003-206932 | 7/2003 |
| JP | 3549530 | 4/2004 |
| JP | 2004-293783 | 10/2004 |
| JP | 2005-036880 | 2/2005 |

OTHER PUBLICATIONS

International Search Report mailed Dec. 5, 2006 for International Application No. PCT/JP2006/317280.

Japanese Office Action issued Apr. 21, 2011 in corresponding Japanese Patent Application No. 2006-229772 w/English translation.

Japanese Office Action issued Sep. 6, 2011 in corresponding Japanese Patent Application No. 2005-363799 w/English translation.

* cited by examiner

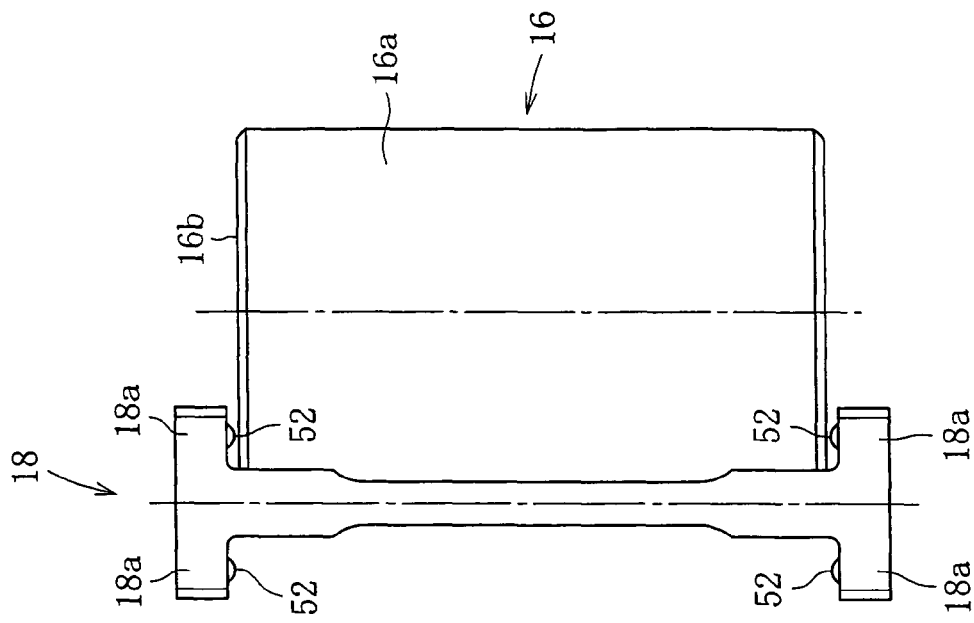
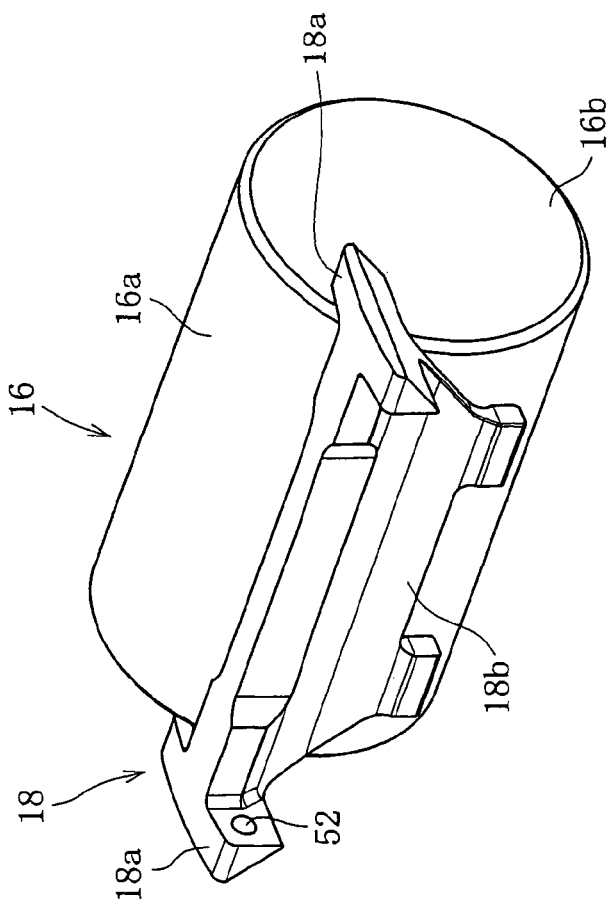

ROLLER BEARING

TECHNICAL FIELD

This invention relates to a roller bearing having spacers interposed between rollers.

BACKGROUND ART

Patent Document 1 describes a roller bearing having spacers interposed between rollers. In such a type of roller bearing, its load capacity can be improved without significantly reducing the rotational performance by interposing the spacers, in place of a cage, between the rollers. Specifically, the spacers can prevent adjacent rollers from coming into contact with each other, and tensile stress associated with changes in separation distance between the rollers is not exerted on the spacers provided separately and independently. Therefore, the size and number of the rollers can be increased.
[Patent Document 1] Japanese Patent No. 3549530.

SUMMARY OF THE INVENTION

Problems to be Solved by the Invention

In the roller bearing described in Patent Document 1, the motion of the spacers is restricted by the raceway surfaces of inner and outer rings and by the side surfaces of the flanges of the inner and outer rings. Therefore, the interposed spacers must have substantially the same size as that of the radial cross-section of the rollers, and the stirring resistance of lubricating oil caused by the spacers is high. Hence, such a roller bearing is not suitable for high speed rotation. Moreover, since the spacers slide on the raceway surfaces of the inner and outer rings, the smooth formation of an oil film on rolling surfaces may be disturbed.

The principal object of this invention is to provide a roller bearing including spacers interposed between rollers, the roller bearing having a high permissible rotational speed which is achieved by allowing a lubricant to smoothly flow around rolling surfaces so that the stirring resistance of the lubricant caused by the spacers is reduced.

Means for Solving the Problems

A roller bearing of a first aspect of this invention includes: a plurality of rollers interposed between an inner ring raceway surface and an outer ring raceway surface to freely rotate; and a spacer provided between adjacent ones of the rollers. The roller bearing is characterized in that each of the spacers has at both axial ends thereof extended portions each facing end faces of the adjacent ones of the rollers. For example, the extended portions are formed by extending the end portions of the spacer in the circumferential or tangential direction of the pitch circle of the rollers.

The axial motion of the spacers is restricted by the extended portions, and the radial motion is restricted by the rolling contact surfaces of the rollers, the outer surfaces of flanges of the inner ring, or the inner surfaces of flanges of the outer ring. Specifically, the raceway surface of the inner or outer ring and the side surfaces of the flanges are not used as means for restricting the motion of the spacers. Therefore, the spacers need not be interposed over a wide area between adjacent rollers, and the stirring resistance of a lubricant can be suppressed. In addition to this, the lubricant is not prevented from flowing smoothly around the rolling surfaces. Consequently, a roller bearing can be provided in which heat generation during operation is suppressed and which has a high permissible rotational speed.

Moreover, when the spacers are guided by the outer surfaces of the flanges of the inner ring or the inner surfaces of the flanges of the outer ring, the extended portions serve as guiding surfaces. Therefore, the guiding area increases as compared to the case in which the spacers are not extended, and an oil film is formed easily on the guiding surfaces, so that the amount of wear of the spacers can be reduced.

A second aspect of the invention is characterized in that, in the first aspect of the roller bearing, a circumferential clearance S falls within a range of $0.001 \times Dw \times Z \leq S \leq 0.01 \times Dw \times Z$, where Dw is a diameter of the rollers, and Z is a number of the rollers. By setting the lower limit to $0.001 \times Dw \times Z$, the disappearance of the circumferential clearance due to thermal expansion of the rollers and spacers during operation can be prevented. By setting the upper limit to $0.01 \times Dw \times Z$, the behavior of the spacers can be stabilized, and accordingly, vibration can be suppressed.

A third aspect of the invention is characterized in that, in the first or second aspect of roller bearing, a maximum value L of a length of the extended portions of the spacers falls within a range of $0.2 \times Dw \leq L \leq 0.9 \times Dw$, where Dw is the diameter of the rollers. The reason that the lower limit is set to $0.2 \times Dw$ is that the extended portions are brought into contact with flat portions of the roller end faces excluding chamfered portions. The reason that the upper limit is set to $0.9 \times Dw$ is to prevent adjacent rollers from interfering with each other.

A fourth aspect of the invention is characterized in that, in the first to third aspect of the roller bearing, the spacers extend from an inner side of a pitch circle of the rollers to an outer side of the pitch circle and that a surface of each of the spacers that faces a rolling contact surface of an adjacent one of the rollers has a concave cross-sectional shape for receiving the rolling contact surface of the roller. By employing such a configuration, the radial motion of the spacers can be restricted only by the rolling contact surfaces of the rollers. In other words, by simply sandwiching each of the spacers between the rollers, the radial motion of the spacers can be restricted without causing the spacers to slide on the inner ring or the outer ring.

A fifth aspect of the invention is characterized in that, in the first to fourth aspect of the roller bearing, each of the spacers is guided by an inner surface of a flange of the outer ring. A sixth aspect of the invention is characterized in that, in the first to fourth aspect of the roller bearing, each of the spacers is guided by an outer surface of a flange of the inner ring. It is sufficient to simply sandwich each of the spacers between the rollers as described above. However, by allowing the spacers to be guided by the inner surface of the flange of the outer ring or the outer surface of the flange of the inner ring, the behavior thereof is further stabilized. In the case in which each of the spacers is simply sandwiched between the rollers, the behavior of a spacer located adjacent to the circumferential clearance is unstable.

A seventh aspect of the invention is characterized in that, in the first to sixth aspect of the roller bearing, an oil groove is provided in a surface (roller-contacting surface) of each of the spacers that comes into contact with a corresponding one of the rollers. By providing the oil groove in the roller-contacting surface of each of the spacers, the incoming and outgoing flow of the lubricant around the rollers is facilitated, so that the cooling efficiency of the bearing due to the lubricant is improved.

An eighth aspect of the invention is characterized in that, in the first to seventh aspect of the roller bearing, a recessed portion for retaining a lubricant is provided in a surface (roller-contacting surface) of each of the spacers that comes into contact with a corresponding one of the rollers. Examples of the recessed portion include a closed-end recessed portion and a through hole. By employing such a configuration, the lubricant can be retained in the recessed portion, and the recessed portion is particularly suitable for retaining grease.

A ninth aspect of the invention is characterized in that, in the first to eighth aspect of the roller bearing, a guiding surface provided in a surface of each of the spacers that faces the inner surface of the flange of the outer ring is formed into a convex shape having a radius of curvature less than that of the inner surface of the flange of the outer ring. If the convex shape is formed of two flat surfaces, the above radius of curvature represents the radius of curvature of an arc connecting the intersection of the two flat surfaces and the end point of each of the flat surfaces. By employing such a configuration, a so-called "wedge film effect" (the effect that the viscosity of a fluid causes the fluid to be drawn into a wedge-like space narrowed in the direction of motion to thereby generate pressure, or load capacity) is generated on the guiding surface, so that the occurrence of oil film rupture on the guiding surface can be suppressed.

Moreover, since the spacers are not required to slide on the raceway surface of the inner ring or the outer ring as described above, the formation of the oil film on the rolling surfaces is not inhibited. Furthermore, in contrast to the conventional technology, the area of the guiding surface of the spacer is not restricted by the gap between the rollers.

The load capacity of the oil film, which is obtained by the wedge film effect, increases as the area of the guiding surface increases. For example, when the length of the guiding surface is doubled in the direction of motion of the guiding surface, or the circumferential direction of the extended portion, the load capacity of the oil film can be quadrupled. Specifically, the extended portion of the spacer plays a role in restricting the motion of the spacer in the axial direction and has another advantage of increasing the area of the guiding surface.

A tenth aspect of the invention is characterized in that, in the ninth aspect of the roller bearing, the radius of curvature $R_2$ of the convex shape falls within a range of $0.3 \times R_1 < R_2 < 0.6 \times R_1$, where $R_1$ is the radius of curvature of the inner surface of the flange of the outer ring. By employing such a configuration, the occurrence of oil film rupture on the guiding surface can be suppressed. The reason that the upper limit is set to $0.6 \times R_1$ is to avoid edge contact on the guiding surface even when the behavior of the spacers is disturbed so that the wedge film effect is generated. In the roller bearing of this type, the behavior of a spacer located adjacent to the circumferential clearance is unstable. Specifically, since the spacer released from the rolling contact surfaces of the adjacent rollers can move and rotate within the circumferential clearance, the approach angle (wedge angle) of the guiding surface is not always constant. Therefore, when the radius of curvature of the convex curved surface of each of the spacers is too large, or when the approach angle is too small, the problems that the end portion of the extended portion comes into edge-contact with the inner surface of the flange of the outer ring and that the wedge film effect is not obtained may occur depending on the behavior of the spacer. The reason that the lower limit is set to $0.3 \times R_1$ is to ensure the load capacity of the oil film due to the wedge film effect. When the radius of curvature of the convex curved surface of each of the spacers is too small, or when the wedge angle is too large, the load capacity of the oil film which is obtained by the wedge film effect is reduced.

An eleventh aspect of the invention is characterized in that, in the first to eighth aspect of the roller bearing, a guiding surface provided in a surface of each of the spacers which faces the outer surface of the flange of the inner ring is formed into a convex shape. By employing such a configuration, the "wedge film effect" is generated on the guiding surface, so that the occurrence of oil film rupture on the guiding surface can be suppressed. In addition to this, the edge contact between the end portion of the guiding surface of the spacer and the outer surface of the flange of the inner ring can be avoided.

A twelfth aspect of the invention is characterized in that, in the ninth to twelfth aspect of the roller bearing, a flat portion is provided in a top portion of the convex shape of each of the spacers formed by injection molding a resin material. By employing such a configuration, the occurrence of oil film rupture on the guiding surface and the formation of wear debris can be suppressed.

In order to reduce the cost of a mold and to facilitate the open-close control of the mold during molding, the parting surface of the mold may be provided in a plane that divides the shape of the spacer into two right-left symmetric parts which do not have an undercut shape. Specifically, in the case of the spacer described above, a parting line is provided in a plane which passes through the top of the convex shape and divides the spacer in the axial direction into two parts. However, since the parting line may be accompanied by burr and steps, wear debris may be formed by sliding motion on a bearing ring, and the parting line may cause oil film rupture. Hence, by providing the flat portion on top of the convex shape, the contact between the parting line of the spacer and the bearing ring can be avoided.

A thirteenth aspect of the invention is characterized in that, in the twelfth aspect of the roller bearing, a parting line of each of the spacers passes through a position which is located within the flat portion and is displaced from a center line bisecting a width of the spacer. By employing such a configuration, the injection-molded spacer can be reliably released from the mold. In order to release the injection-molded product from the mold, the product must adhere to the side of a core plate (movable-side mold) having a protruding pin when the mold is opened. However, when the parting line of the mold is provided in a plane which divides the product into two right-left symmetric parts, the product can adhere to a cavity plate (fixed-side mold) when the mold is opened, so that the problem that the product cannot be released from the mold occurs. In view of the above, by slightly displacing the parting line from the center line toward the cavity plate side so that the contact area between the spacer and the mold is greater on the core plate side than on the cavity plate side, the spacer is allowed to adhere to the core plate side reliably when the mold is opened.

A fourteenth aspect of the invention is characterized in that, in the first to thirteenth aspect of the roller bearing, a protruding portion is provided in each of the extended portions, the protruding portion facing a corresponding one of the end faces of the rollers. By employing such a configuration, only the end portion of the protruding portion comes into contact with the roller end face. Therefore, the lubricant is allowed to flow smoothly around the roller end face, and the occurrence of oil film rupture on the roller end face can be suppressed. Specifically, by reducing the contact area between the spacer and the roller end face, and by forming a space around the protruding portion, the lubricant is allowed to flow smoothly. Therefore, a rich amount of the lubricant can be supplied to the gap between the roller end face and the side surface of the flange of the bearing ring, so that the occurrence of scoring and heat generation can be suppressed.

A fifteenth aspect of the invention is characterized in that, in the fourteenth aspect of the roller bearing, the protruding portion faces a portion of the corresponding one of the end faces of the rollers excluding a region coming into contact with a flange of a bearing ring. By employing such a configuration, the lubricant is allowed to flow smoothly, and the occurrence of scoring and heat generation can be suppressed. In addition to this, functionally harmful flaws are not formed on the roller end face. Moreover, by providing the contacting portion in a position close to the center of the roller end face, the sliding speed thereof is reduced, and wear of the end portion of the protruding portion of each of the spacers can be reduced.

A sixteenth aspect of the invention is characterized in that, in the fourteenth aspect of the roller bearing, the spacers are made of resin and the protruding portion extends perpendicular to a parting surface of a mold. By employing such a configuration, the manufacturing cost of the spacers can be reduced. Specifically, by providing the spacer shape not having an undercut, a complicated mechanism such as a loose core or a slide core is not needed, and the cost of the mold can be reduced by simplifying the shape of the mold.

A seventeenth aspect of the invention is characterized in that, in the fourteenth to sixteenth aspect of the roller bearing, an end portion of the protruding portion has a curved surface. By employing such a configuration, the edge contact with the roller-edge surface can be avoided, and the occurrence of oil film rupture can be suppressed.

An eighteenth aspect of the invention is characterized in that, in the first to thirteenth aspect of the roller bearing, a protruding portion is provided in each of the extended portions so as to protrude toward a corresponding one of the end faces of the rollers and that a recessed portion is formed in the corresponding one of the end faces of the rollers, the protruding portion being placed into the recessed portion. By employing such a configuration, the rollers and spacers can be prevented from falling off when the outer ring is removed. Specifically, by connecting the roller end faces to each other through the extended portions of the spacers, the outward expansion of the rollers can be suppressed, and the rollers and spacers are prevented from falling off the inner ring.

A nineteenth aspect of the invention is characterized in that, in the eighteenth aspect of the roller bearing, the protruding portion and the recessed portion are arranged so as not to interfere with each other during the operation of the bearing. By employing such a configuration, the roller bearing can be designed such that tensile stress is not exerted on the spacers. A spacer located in the circumferential clearance has a slight degree of motional flexibility, and the degree of the motional flexibility is determined mainly by the size of the circumferential clearance. Specifically, by adjusting the positional relationship between the protruding portion and the recessed portion of the roller end face in consideration of the degree of motional flexibility, the phenomenon that the spacer is pulled by two rollers adjacent thereto can be avoided.

A twentieth aspect of the invention is characterized in that, in the eighteenth or nineteenth aspect of the roller bearing, a height h of the protruding portion falls within a range of W−Lw<h<d, where Lw is a length of the rollers, d is a depth of the recessed portion, and W is a distance between the contact surfaces of the spacers. By employing such a configuration, wear of the end portion of the protruding portion can be avoided. Specifically, by restricting the axial motion of the spacers by the roller end faces and the contact surfaces of the spacers, the contact between the end portion of the protruding portion and the bottom surface of the recessed portion of the roller end face can be avoided.

A twenty-first aspect of the invention is characterized in that, in the eighteenth to twentieth aspect of the roller bearing, a thin-walled portion is provided in a base portion of each of the extended portions. By employing such a configuration, the ease of assembling is improved. The protruding portions of the spacers are placed into the recessed portions of the roller end faces while the extended portions are deformed elastically. Specifically, by reducing the stiffness of the base portions of the extended portions, the extended portions are easily deformed elastically.

BRIEF DESCRIPTION OF THE DRAWINGS

FIG. 11A is a plan view illustrating a modified example of the spacer.

FIG. 11B is a perspective view of the spacer of FIG. 11A.

Figure 1:
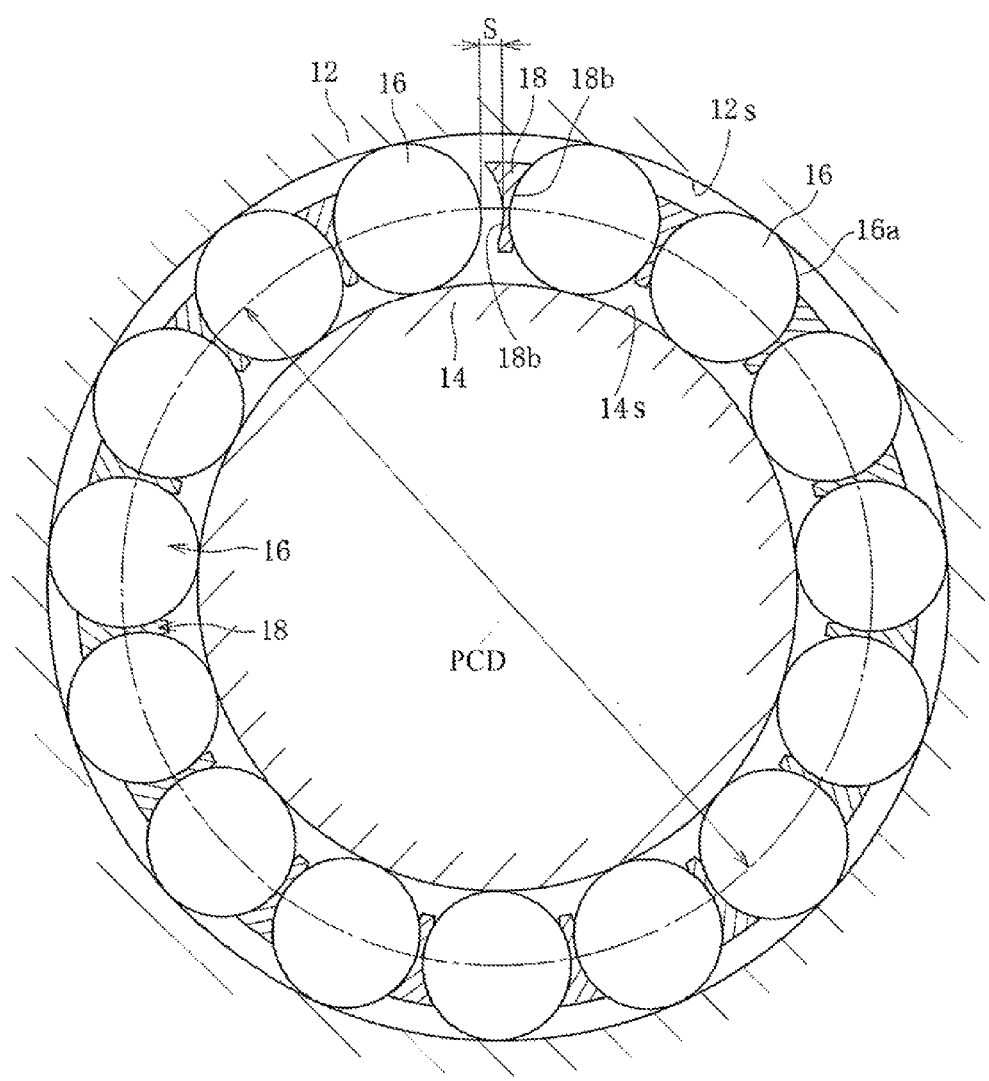
FIG. 1 is a schematic drawing illustrating a roller bearing of an embodiment of this invention.

DESCRIPTION OF REFERENCE NUMERALS 12 outer ring
12a flange
12b annular step
14 inner ring
14a flange
16 roller
16a rolling contact surface
16b roller end face
18 spacer
18a extended portion
18b roller-contacting surface
18c oil groove
18d oil groove
18e recessed portion
18f recessed portion
18g through hole
18h through hole
20 notch
22 protruding portion
24 recessed portion
26 (thin-walled portion) notch
28 guiding surface (outer surface of extended portion)
52 protruding portion
54 guiding surface (convex curved surface)
56 flat portion
58 parting line
60, 64 mold
62, 66 parting surface

DETAILED DESCRIPTION OF THE INVENTION

Hereinafter, embodiments of the present invention will be described with reference to the drawings.

Figure 2:
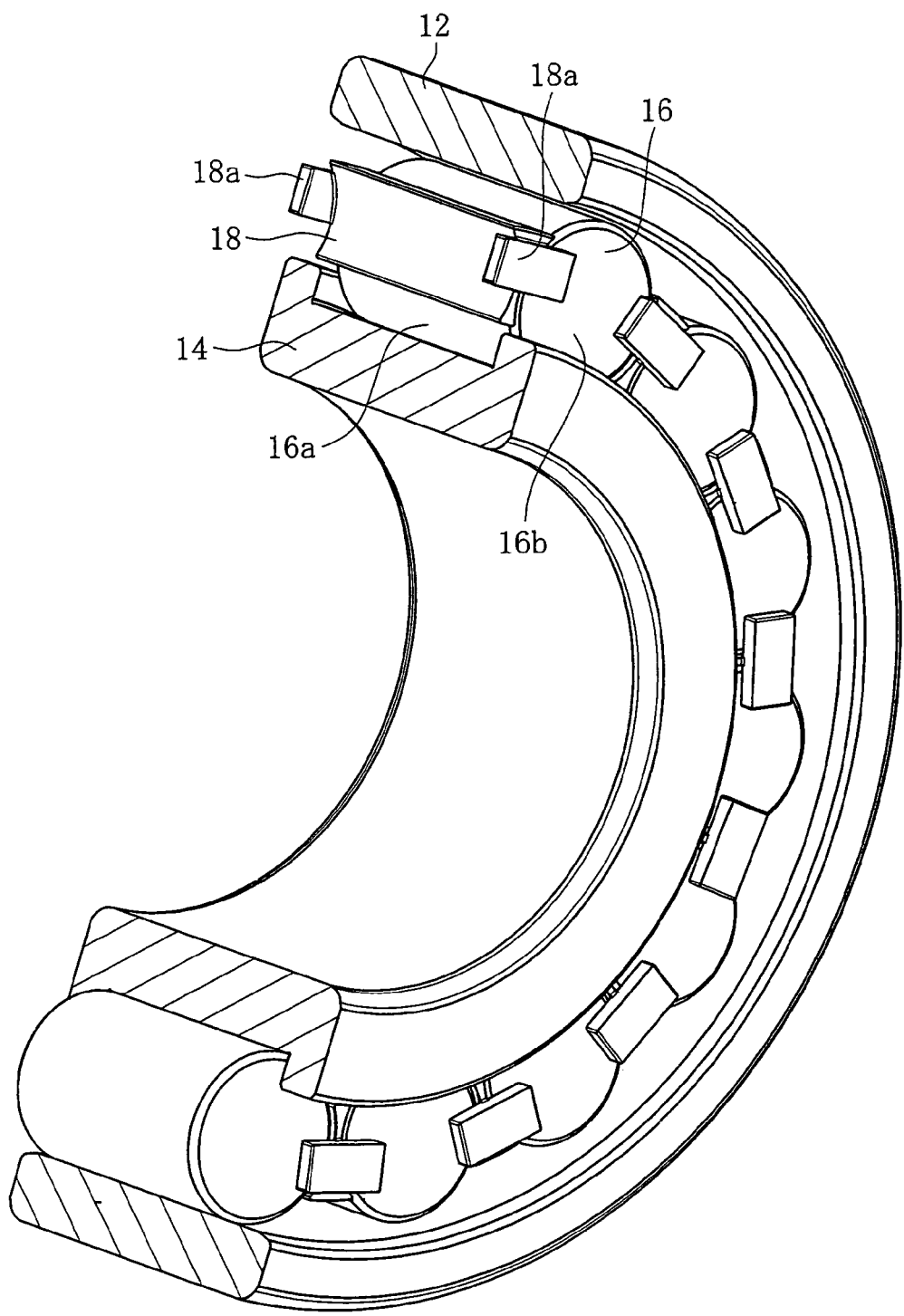
FIG. 2 is a cutaway perspective view of the roller bearing of FIG. 1.

The embodiment shown in FIGS. 1 and 2 is an example in which the invention is applied to a cylindrical roller bearing, and the cylindrical roller bearing is composed of an outer ring 12, an inner ring 14, cylindrical rollers 16, and spacers 18. Each of the cylindrical rollers 16 has a rolling contact surface 16a which rolls on the raceway surface 12s of the outer ring 12 and on the raceway surface 14s of the inner ring 14. Each of the spacers 18 is interposed between adjacent ones of the cylindrical rollers 16.

Figure 3A:
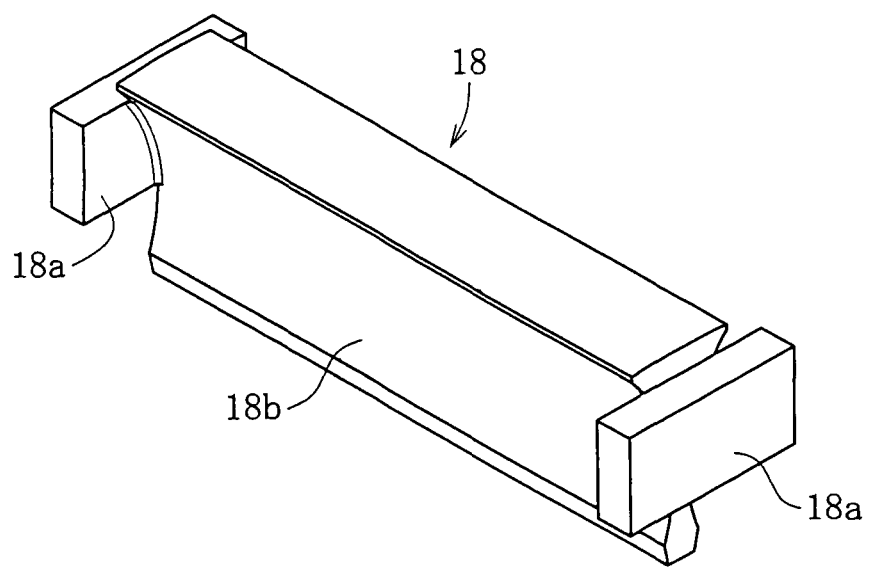
FIG. 3A is a perspective view of a spacer in FIG. 2.
Figure 3B:
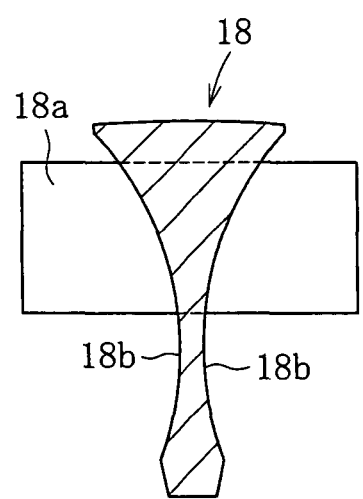
FIG. 3B is a cross-sectional view of the spacer of FIG. 3A.

As can be seen from FIG. 2, each of the spacers 18 has extended portions 18a at both ends thereof. The extended portion 18a extends in a tangential direction of the pitch circle of the rollers. As shown in FIGS. 3A and 3B, a surface 18b (hereinbelow referred to as a roller-contacting surface) of the spacer 18 which comes into contact with the cylindrical roller 16 has a cross-sectional shape which is a concave arc having a radius of curvature slightly greater than the radius of curvature of the rolling contact surface 16a of each of the rollers 16. As can be seen from FIG. 1, the roller-contacting surface 18b extends across the pitch circle diameter PCD of the rollers indicated by a long dashed short dashed line, i.e., from the inner side of the pitch circle of the rollers to the outer side. Therefore, the radial motion of the spacers 18 is restricted only by the rolling contact surface 16a of each of the rollers 16.

Figure 4:
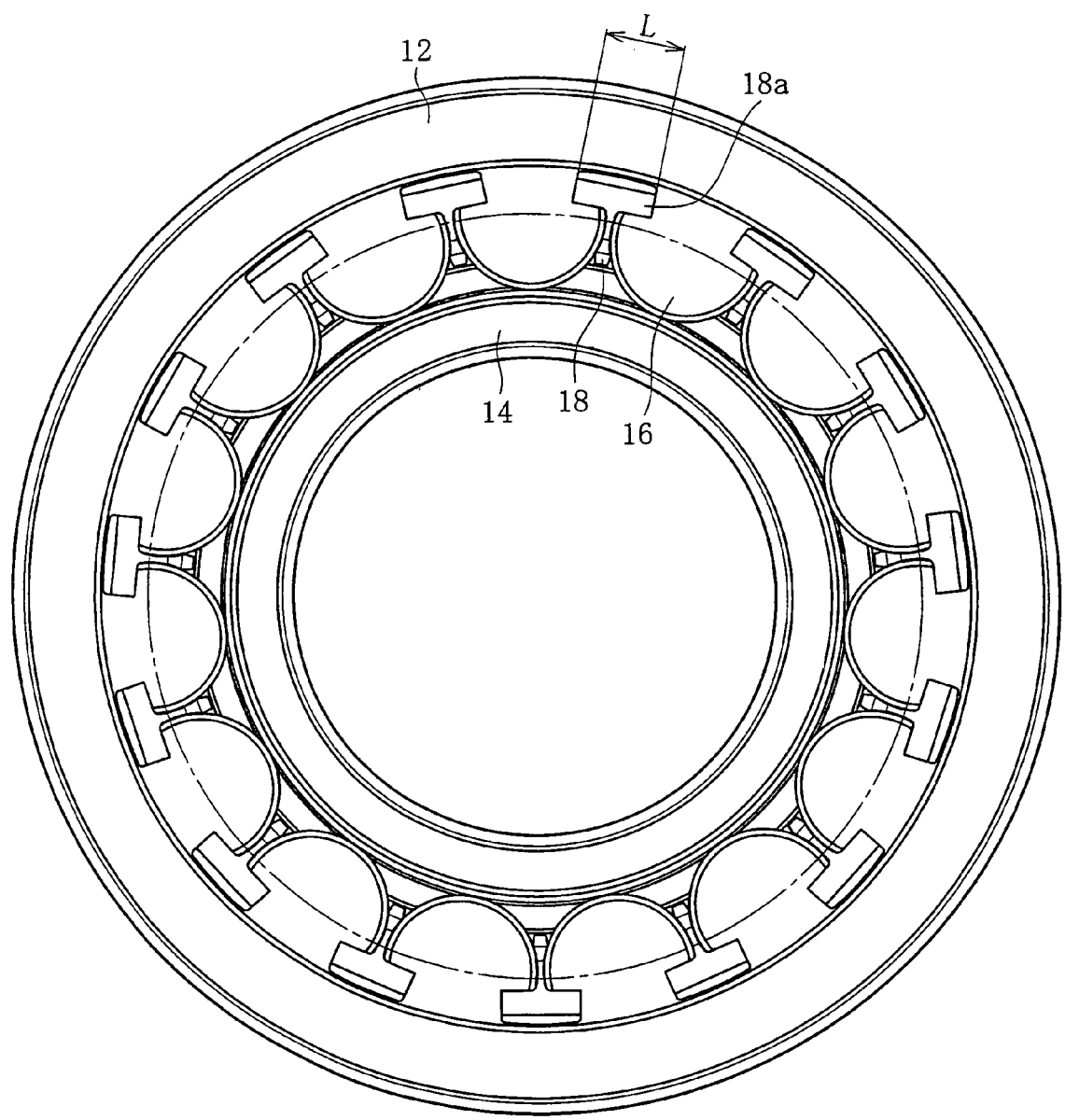
FIG. 4 is a front view illustrating a roller bearing of another embodiment.
Figure 5A:
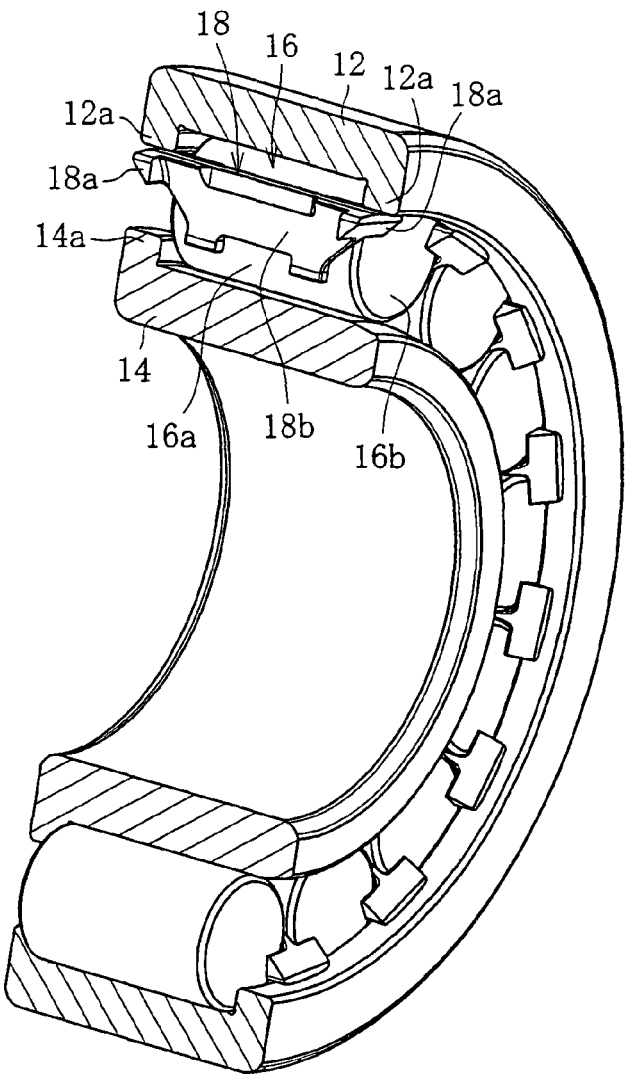
FIG. 5A is a cutaway perspective view of the roller bearing of FIG. 4.
Figure 5B:
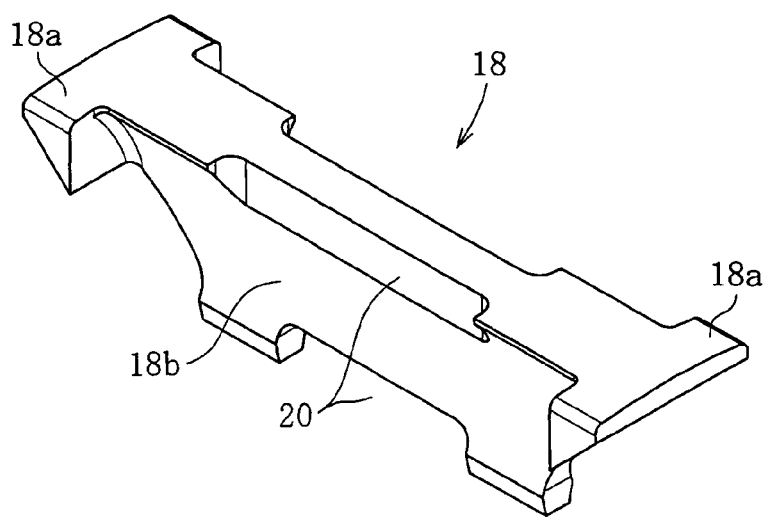
FIG. 5B is a perspective view of a spacer in FIG. 5A.

In an embodiment shown in FIGS. 4, 5A, and 5B, the extended portions 18a of each of the spacers 18 are guided by the inner surfaces of flanges 12a of the outer ring 12.

In this manner, the behavior of the spacers 18 is stabilized. Specifically, by supporting the outer surfaces of the extended portions 18a of each of the spacers 18 by the inner surfaces of the flanges 12a of the outer ring 12, the radial motion of the spacers 18 is restricted, so that the behavior of the spacers 18 is stabilized. The outer surface-of each of the extended portions 18a is shaped into a partially cylindrical surface. In addition to this, a notch 20 for improving the cooling efficiency of the bearing by a lubricant is provided in the roller-contacting surfaces 18b and inner surface (lower surface) of each of the spacers 18.

A description will be given of the case in which 66 Nylon (natural) is used as the material for the spacers 18 and the spacers 18 are applied to NJ2324E (φ120×φ260×86). In this instance, the circumferential clearance S is 1.5 mm, which is expressed by the following equation: S=0.0026×Dw×Z. In addition to this, the wall thickness of the thinnest portion of each spacer 18 is 1.8 mm. In this case, even when the temperature of the bearing is increased by 100° C., the total thermal expansion of the rollers 16 and the spacers 18 is approximately 1 mm. Hence, the circumferential clearance S (see FIG. 1) does not disappear, and the bearing can withstand use under general temperature conditions. Note that the linear expansion coefficient of the cylindrical rollers (bearing steel) is $12.5 \times 10^{-6}$ (° C.), and the linear expansion coefficient of the spacers (66 Nylon (N)) is $9 \times 10^{-5}$ (° C.). The maximum value L of the length of the end portions of each of the spacers 18 which extends in the tangential direction of the pitch circle (see FIG. 4) is 20 mm, which is expressed by the following equation: L=0.5×Dw. In this case, the extended portion 18a comes into contact with a roller end face 16b at a position beyond the chamfer of the roller 16, and any adjacent spacers 18 do not interfere with each other.

An Example in which the spacers are applied to NJ2324E (φ120×φ260×86) and a Comparative Example in which a machined cage is used are compared for the number of rollers and the ratio of the life of the bearing, and the results are shown in Table 1.

TABLE 1

| | ROLLER | | | SPACER/BAR | |
|---|---|---|---|---|---|
| | DIMENSION (mm) | P.C.D. (mm) | NUMBER OF ROLLERS | THICKNESS ON P.C. (mm) | LIFE RATIO (%) |
| EMBODIMENT | φ 38 × 62 | φ 192 | 15 | 2 | 140 |
| COMPARATIVE EXAMPLE | φ 38 × 62 | φ 192 | 13 | 8 | 100 |

P.C.D.: Pitch Circle diameter
P.C.: Pitch Circle

Figure 6A:
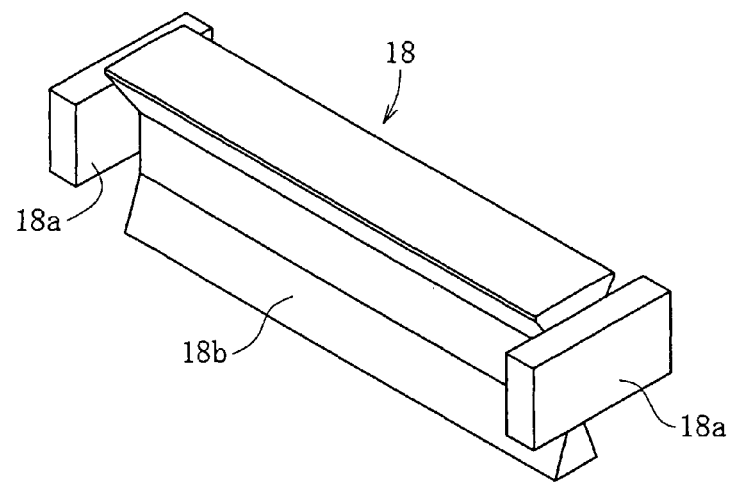
FIG. 6A is a perspective view illustrating a modified example of the spacer.
Figure 6B:
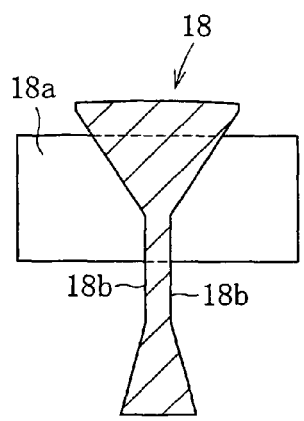
FIG. 6B is a cross-sectional view of the spacer of FIG. 6A.

FIGS. 6A to 6D show modified examples of the spacer 18. In this case, as is clear from comparison with FIGS. 3A and 3B, each of the roller-contacting surfaces 18b of the spacer 18 has a concave shape formed of a combination of straight surfaces. As shown in FIG. 6B, the cross-sectional shape of each of the roller-contacting surfaces 18b is formed of a combination of straight lines.

Figure 6C:
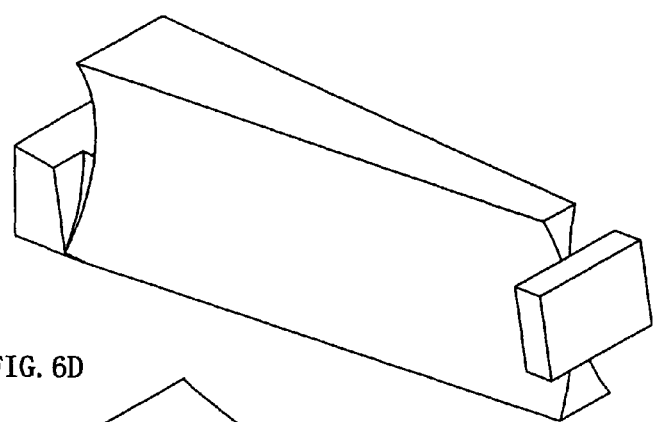
FIG. 6C is a perspective view illustrating another modified example of the spacer.

When the spacer is applied to a tapered roller bearing, it is preferable that the roller-contacting surfaces of the spacer have an inclined concave shape (see FIG. 6C).

Figure 6D:
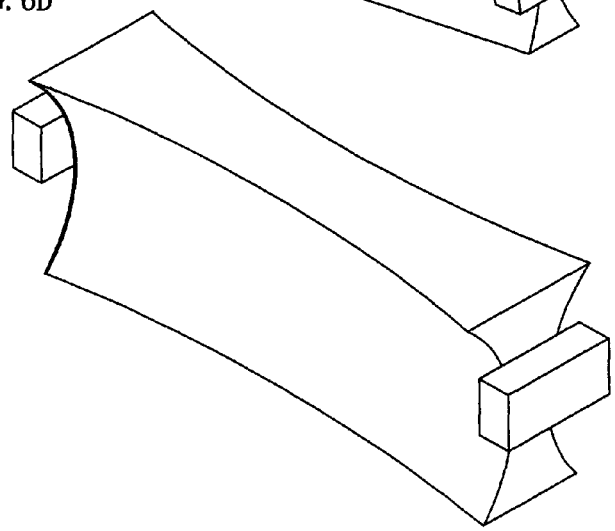
FIG. 6D is a perspective view illustrating another modified example of the spacer.

When the spacer is applied to a spherical roller bearing, it is preferable that the roller-contacting surfaces of the spacer have a concave spherical shape (see FIG. 6D).

Figure 7A:
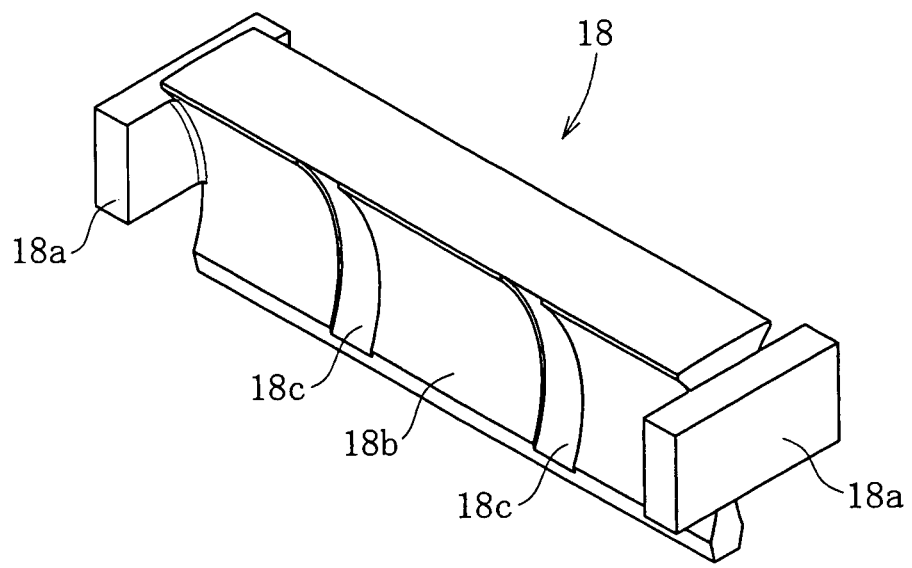
FIG. 7 is a set of perspective views illustrating other modified examples of the spacer.
Figure 7B:
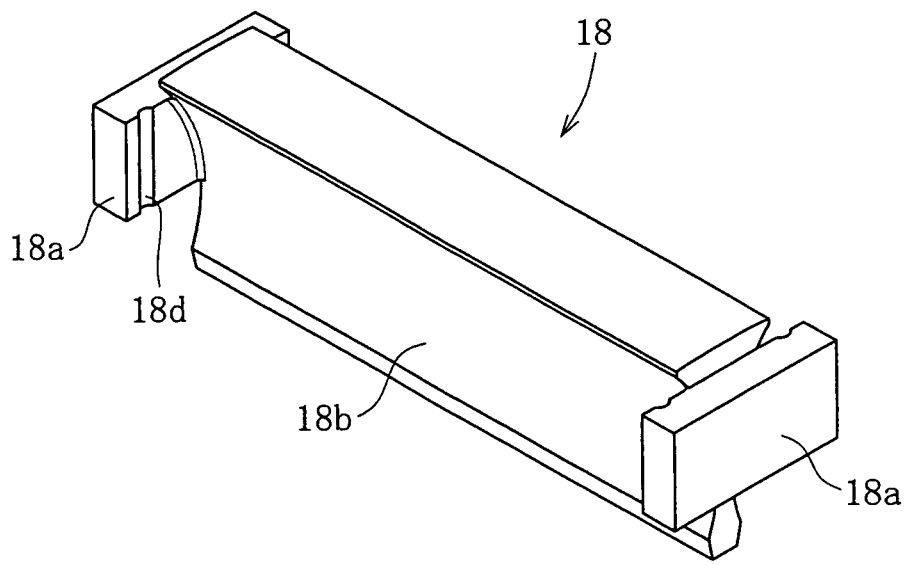

FIGS. 7A and 7B show modified examples of the spacer 18 in which oil grooves are provided. FIG. 7A shows oil grooves 18c provided in the roller-contacting surface 18b of the spacer 18, and FIG. 7B shows oil grooves 18d provided in the inner surfaces of the extended portions 18a of the spacer 18. A single spacer 18 may be provided with both the oil grooves 18c and 18d. The number of the oil grooves may be one or more, and the oil grooves may or may not be parallel to the radial direction of the bearing. Furthermore, two or more oil grooves may intersect with each other.

Figure 8A:
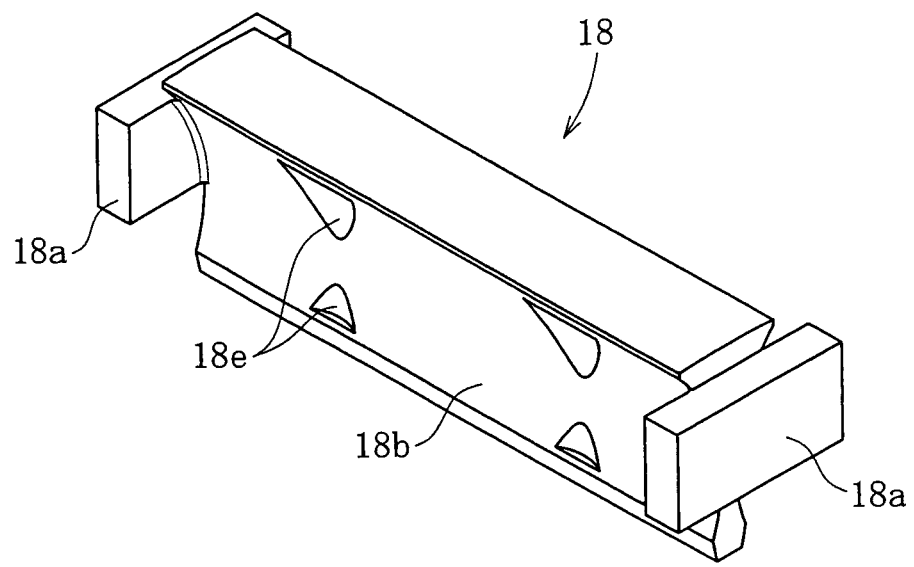
FIG. 8 is a set of perspective views illustrating other modified examples of the spacer.
Figure 8B:
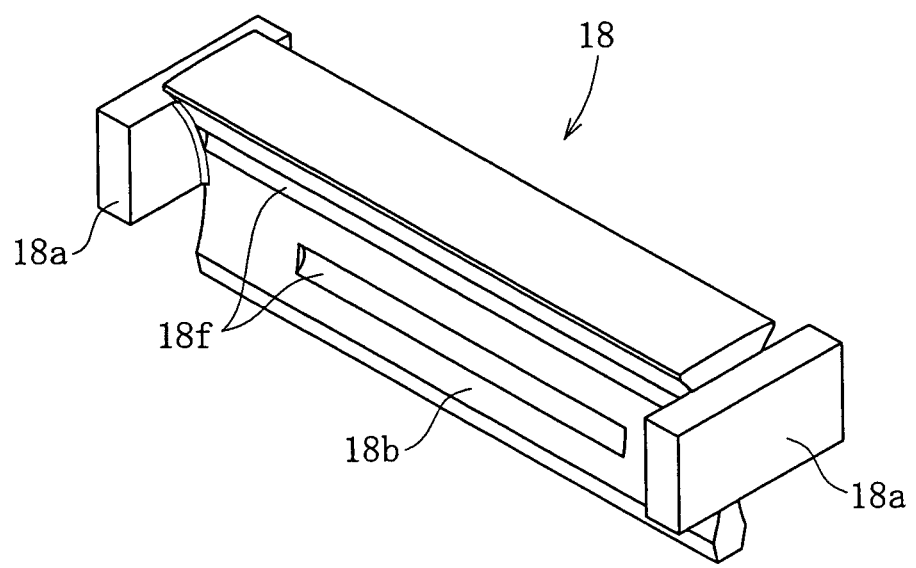
Figure 9A:
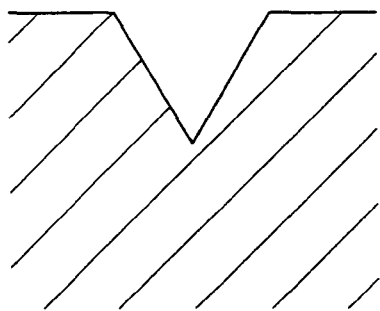
FIG. 9 is a set of enlarged cross-sectional views exemplifying the cross-sectional shapes of an oil groove and a recessed portion.
Figure 9B:
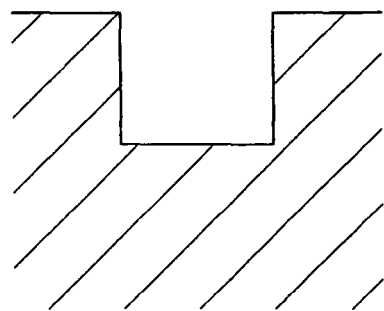
Figure 9C:
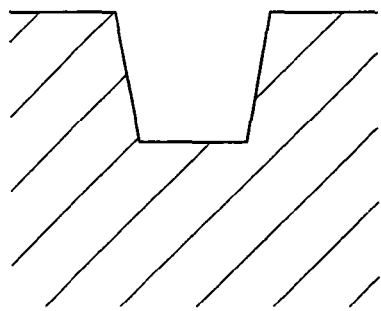
Figure 9D:
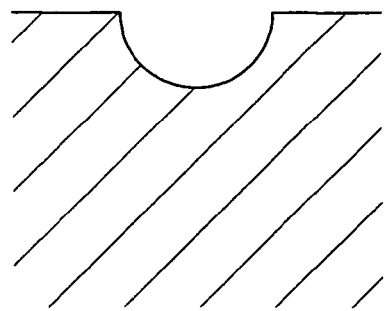
Figure 9E:
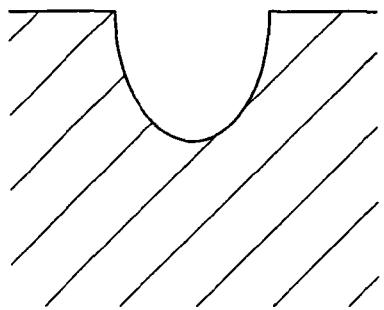
Figure 9F:
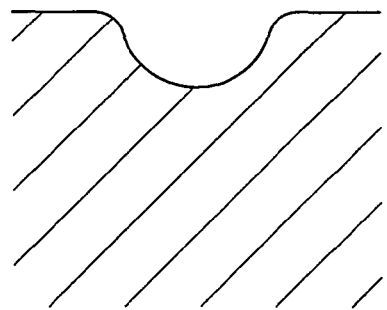

FIGS. 8A and 8B show modified examples of the spacer 18 in which recessed portions for retaining a lubricant are provided. FIG. 8A shows dimple-like recessed portions 18e which are provided in the roller-contacting surface 18b and are independent from each other. FIG. 8B shows groove-like recessed portions 18f extending in the lengthwise direction of the roller-contacting surface 18b.

The oil grooves 18c and 18d and the recessed portions 18e and 18f may have various cross-sectional shapes. FIGS. 9A to 9F exemplify the cases of a V-shape, a rectangular shape, a trapezoidal shape, an arc shape, and ellipsoidal arc shapes.

Figure 10A:
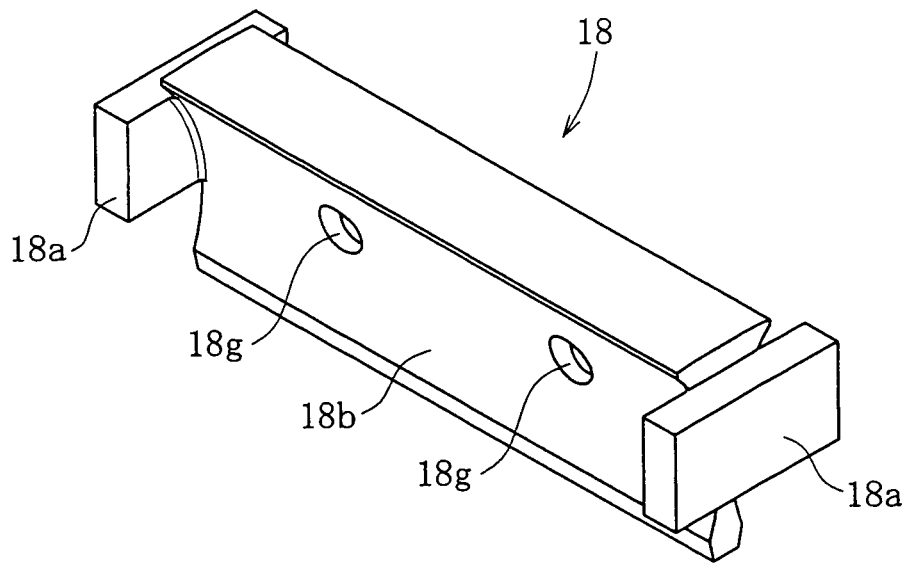
FIG. 10 is a set of perspective views illustrating modified examples of the spacer in which through-holes are provided.
Figure 10B:
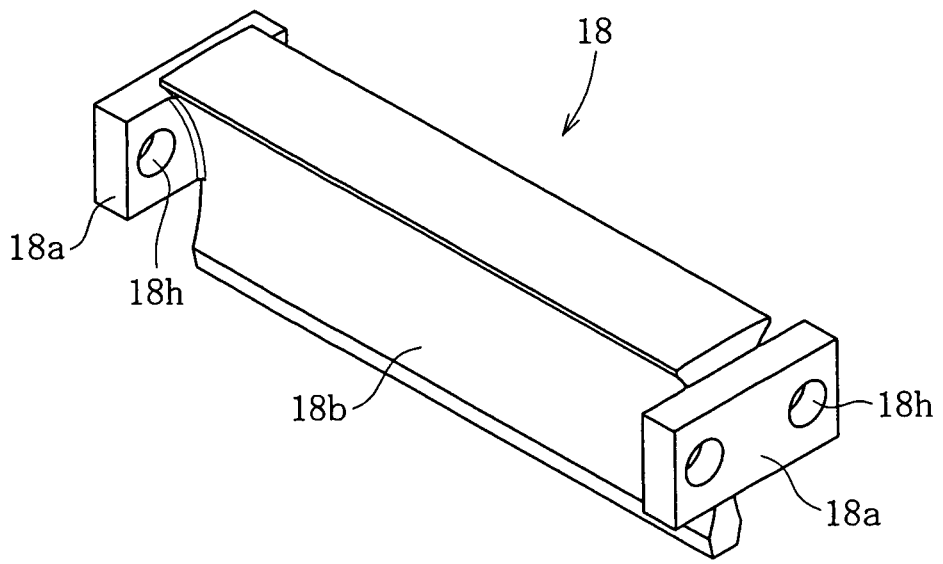

FIGS. 10A and 10B show modified examples of the spacer 18 in which through holes 18g or 18h are provided. The through holes 18g shown in FIG. 10A are provided through the roller-contacting surfaces 18b of the spacer 18, and each of the through holes 18h shown in FIG. 10B passes through the extended portion 18a in the axial direction. The through holes 18g and 18h may be provided at one or more locations and may have various shapes such as quadrangular, triangular, trapezoidal, circular, and ellipsoidal shape.

A solid lubricant containing grease and resin as main components and typified by Polylube (trade name, NTN Corporation) or the like may be filled in the oil grooves 18 and 18d, recessed portions 18e and 18f, and through holes 18g and 18h which are provided in the spacer 18.

In order to avoid the rupture of the spacers 18 and to meet the demand for the retainability of the lubricant, the depths of the oil grooves 18c and 18d and recessed portions 18e and 18f provided in the roller-contacting surfaces 18b of the spacer 18 are adjusted within the range of preferably 0.001×Dw to 0.1×Dw and more preferably 0.01×Dw to 0.1×Dw, where Dw is the diameter of the roller.

Preferably, a chamfer is provided in the opening edge of each of the oil grooves 18c and 18d, the recessed portions 18e and 18f, and the through holes 18g and 18h, in order to avoid edge contact with the rollers 16.

In order to prevent the contact pressure between the spacer 18 and the roller 16 to increase, the area occupied by the oil grooves 18c and 18d, the recessed portions 18e and 18f, and the through holes 18g and 18h is preferably 50% or less, and more preferably 30% or less, of the roller-contacting area when the oil grooves, recessed portions, and through holes are not provided.

In order to avoid the rupture of the spacers 18 and at the same time to achieve a high load capacity of the bearing, the minimum wall thickness of the spacers 18 in a cross-section perpendicular to the axial direction is preferably within the range of 0.03 Dw to 0.2 Dw, where Dw is the diameter of the rollers. When the wall thickness is less than 0.03 Dw, the spacers 18 are likely to rupture. Therefore, the lower limit in the value range is set to 0.03×Dw. The upper limit, 0.20 Dw, corresponds to the wall thickness of pillars of a conventional cage. However, when the wall thickness exceeds this value, the load capacity decreases, so that the upper limit is set to 0.20 Dw.

The material for the spacers 18 may be resin or metal. Injection molding is preferred as the method for producing resin-made spacers. No particular limitation is imposed on the method for producing metal-made spacers, and casting, cutting, forging, pressing, or the like may be used. However, precision casting typified by lost-wax process or the like or forging is preferable in terms of production cost. In particular, when the spacers are manufactured with high precision, it is preferable that post-machining by cutting be employed or that the spacers be produced entirely by cutting.

When the spacers 18 are made of metal, a copper-based allow having relatively better sliding properties than general steel is preferred. Carbon steel, such as S30C, for machine structural use may also be used. Preferably, brass is preferred as the copper-based alloy used for the spacers. In particular, 60-40 brass and high strength brass are preferred. High strength brass is obtained by adding 0.1 to 5.0 wt. % of manganese (Mn) to 60-40 brass, and in some cases, small amounts of additional components such as Al, Fe, Sn, and Ni are added thereto. The strength of the alloy is increased by dissolving these components into α phase or β phase, and the corrosion resistance and wear resistance are also increased.

When the spacers 18 are made of resin, it is preferable that the resin be injection-moldable. Even when the resin contains fibers and other fillers in its composition, this resin may be used so long as it is injection-moldable. Generally, since resin materials are light weight and have self-lubricating properties and a small friction coefficient, it is considered that they are preferable as the material for the spacers. Examples of the resins suitable for the spacers are listed below.

General purpose engineering plastics typified by polycarbonate (PC), polyamide 6 (PA6), polyamide 66 (PA66), polyacetal (POM), modified polyphenylene ether (modified PPE), polybutylene terephthalate (PBT), GF-reinforced polyethylene terephthalate (GF-PET), ultra high molecular weight polyethylene (UHMW-PE), and the like.

Super engineering plastics typified by polysulfone (PSF), polyether sulfone (PES), polyphenylene sulfide (PPS), polyarylate (PAR), polyamideimide (PAI), polyetherimide (PEI), polyether-etherketone (PEEK), liquid crystal polymers (LCP), thermoplastic polyimide (TPI), polybenzimidazole (PBI), polymethylpentene (TPX), poly-(1,4-cyclohexane dimethylene terephthalate) (PCT), polyamide 46 (PA46), polyamide 6T (PA6T), polyamide 9T (PA9T), polyamide 11, 12 (PA11, 12), polytetrafluoroethylene (PTFE), tetrafluoroethylene-perfluoroalkylvinylether copolymers (PFA), tetrafluoroethylene-ethylene copolymers (ETFE), and the like.

The engineering plastics and super engineering plastics listed above, fabric-reinforced phenolic resins, and the like are preferred in terms of mechanical strength, oil resistance, and heat resistance.

Meanwhile, in such a type of roller bearing including the spacers 18 each interposed between adjacent rollers 16, when the spacers 18 are brought into contact with the raceway surface of the outer ring 12 or the inner ring 14 and are guided by the bearing ring, the formation of an oil film on the rolling surfaces may be inhibited. In addition to this, such a type of roller bearing is assembled by alternately arranging the rollers 16 and the spacers 18 along the inner circumference of the outer ring 12 and subsequently press-fitting the last spacer 18 into the gap between the rollers 16. Therefore, in relation to the margin for press-fitting, a spacer 18 having a wall thickness much greater than the gap between the rollers 16 cannot be used, and the area of the guiding surface (the surface coming into sliding contact with the raceway surface) of each spacer 18 decreases inevitably. Hence, the load capacity of the oil film due to a so-called "wedge film effect" on the guiding surface of the spacer 18 is reduced, so that oil film rupture may occur. This is likely to result in heat generation from the bearing and abnormal wear of the spacer 18. Accordingly, it is required to provide a roller bearing which has a high permissible rotational speed and in which heat generation from the bearing and abnormal wear of the spacers are avoided. This can be achieved by specially designing the shape of the spacers 18 to allow the lubricant to flow smoothly around the rolling surfaces and to prevent the occurrence of oil film rupture on the guiding surfaces of the spacers 18.

Figure 15:
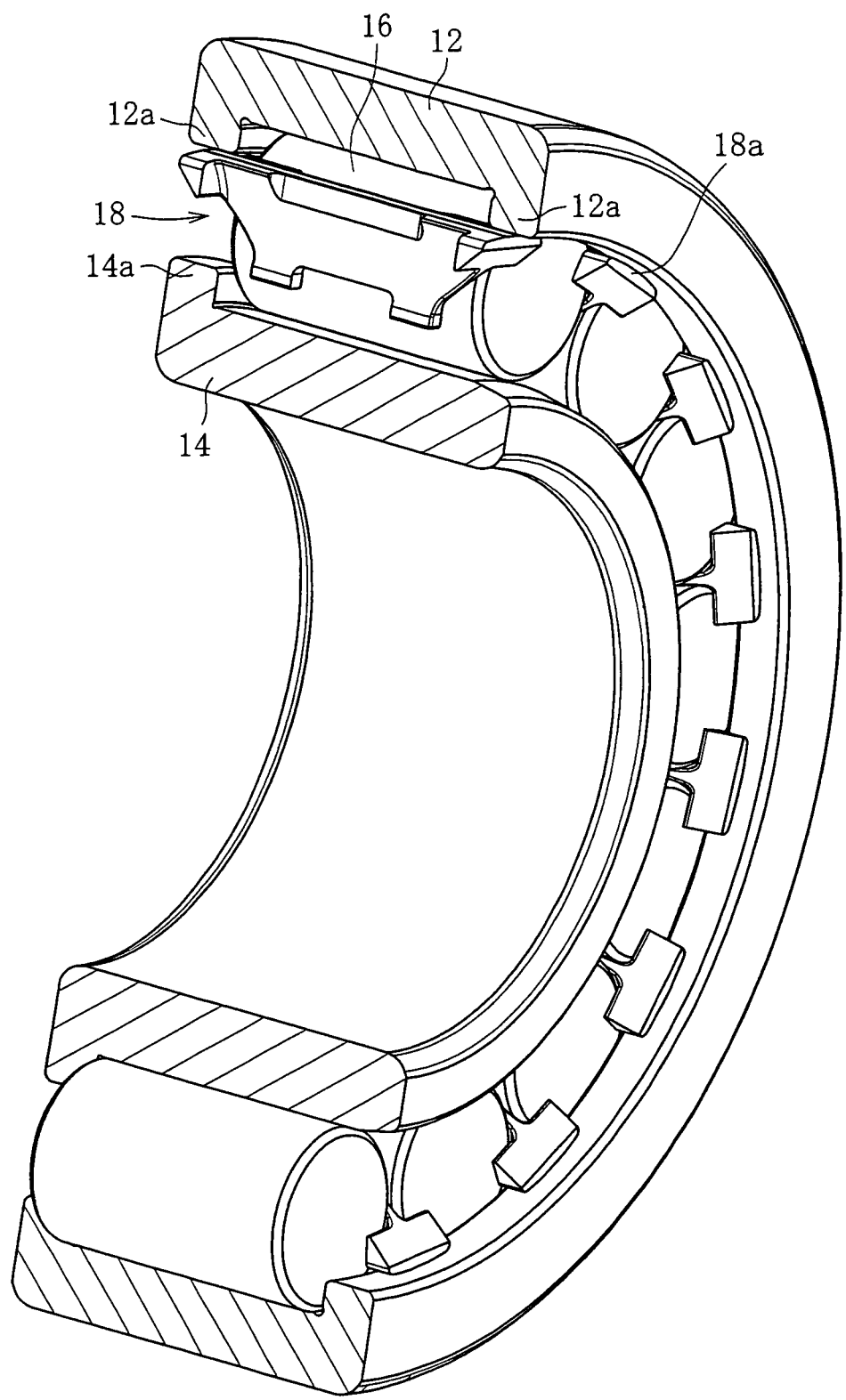
FIG. 15 is a cutaway perspective view illustrating a roller bearing of another embodiment.
Figure 16:
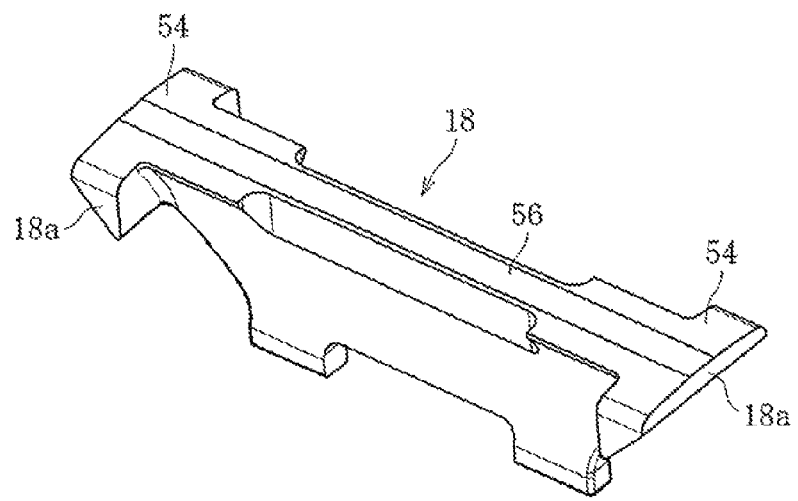
FIG. 16 is a perspective view of a spacer of FIG. 15.
Figure 20:
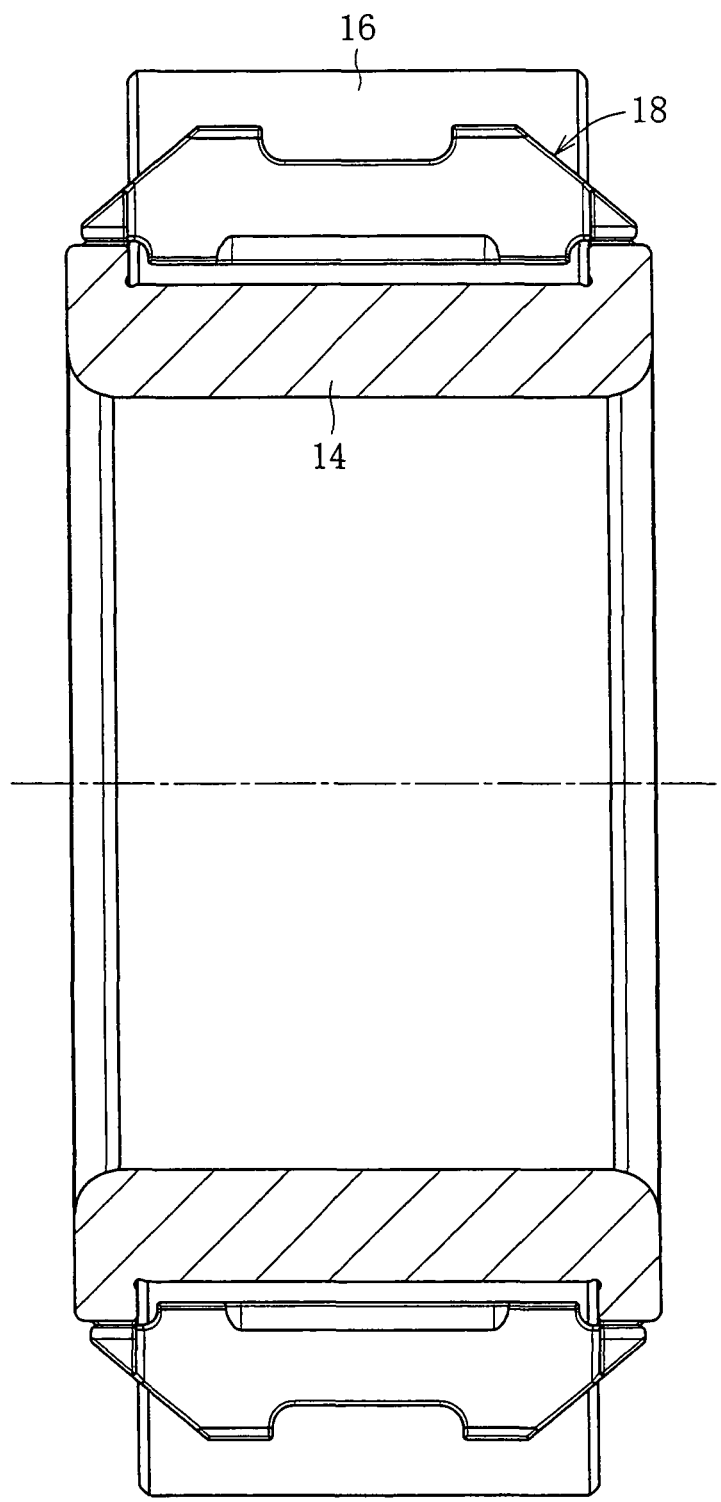
FIG. 20 is a vertical cross-sectional view illustrating an embodiment in which the invention is applied to an N-type cylindrical roller bearing.
Figure 21A:
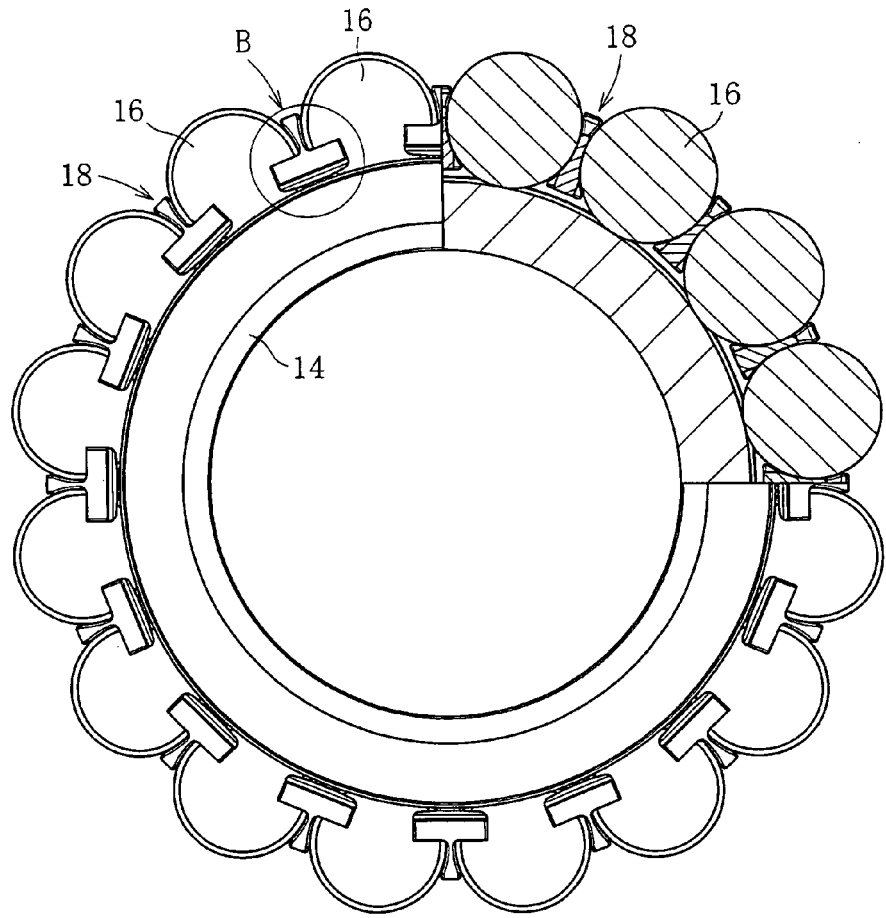
FIG. 21A is a partial cutaway side view of the cylindrical roller bearing of FIG. 20.
Figure 21B:
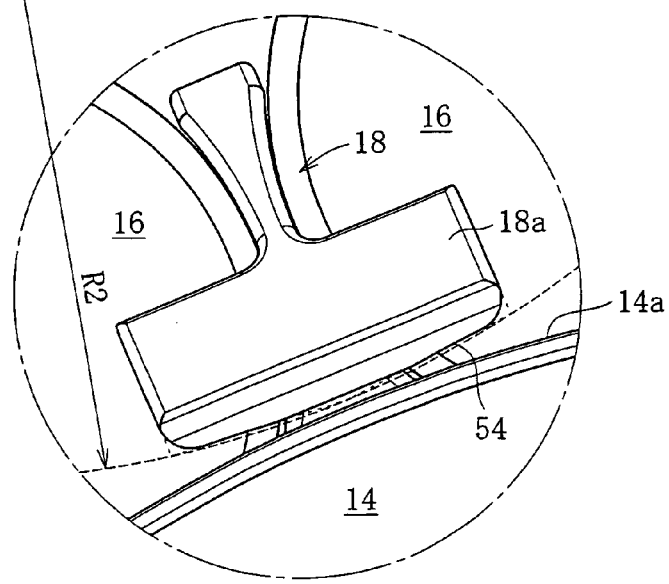
FIG. 21B is a partial enlarged view of the cylindrical roller bearing of FIG. 20.

In an embodiment shown in FIGS. 15 and 16, a guiding surface 54 provided in a surface of the extended portion 18a of the spacer 18 which faces the inner surface of the flange 12a of the outer ring 12 is formed of a convex curved surface having a radius of curvature less than that of the inner surface of the flange 12a of the outer ring 12. Moreover, in an embodiment shown in FIGS. 20, 21A, and 21B, the guiding surface 54 provided in a surface of the extended portion 18a of the spacer 18 which face the outer surface of a flange 14a of the inner ring 14 is formed into a convex shape. By employing the configurations described above, the lubricant is allowed to flow smoothly around the rolling surfaces. In addition to this, the so-called "wedge film effect" (the effect that the viscosity of a fluid causes the fluid to be drawn into a wedge-like space narrowed in the direction of motion to thereby generate pressure, or load capacity) is generated on the guiding surfaces 54, so that the occurrence of oil film rupture on the guiding surfaces 54 can be suppressed.

Furthermore, since the spacers 18 are not required to slide on the raceway surface of the inner ring 14 or the outer ring 12, the formation of the oil film on the rolling surfaces is not inhibited, and the area of the guiding surfaces 54 is not restricted by the gap between the rollers 16 (see FIG. 15). The load capacity of the oil film, which is obtained by the wedge film effect, increases as the area of the guiding surface increased. For example, when the length of the guiding surface is doubled in the direction of motion of the guiding surface, or the circumferential direction of the extended portions, the load capacity of the oil film can be quadrupled. Specifically, the extended portion of the spacer plays a role in restricting the motion of the spacer in the axial direction and has another advantage of increasing the area of the guiding surface (see FIG. 16). As shown in FIG. 16, it is desirable that the end portions of the extended portions 18a, in particular, the outer end edges facing the circumferential direction of the bearing, be chamfered.

In addition, the length of the extended portion 18 is set such that adjacent spacers do not interfere with each other while the load capacity of the oil film is ensured on the guiding surfaces 54. Specifically, for example, it is preferable that the length L of the extended portion fall within the range represented by the following inequality:

$$0.5 \times Dw \leq L \leq 0.9 \times Dw,$$

where Dw is the diameter of the rollers.

Figure 17:
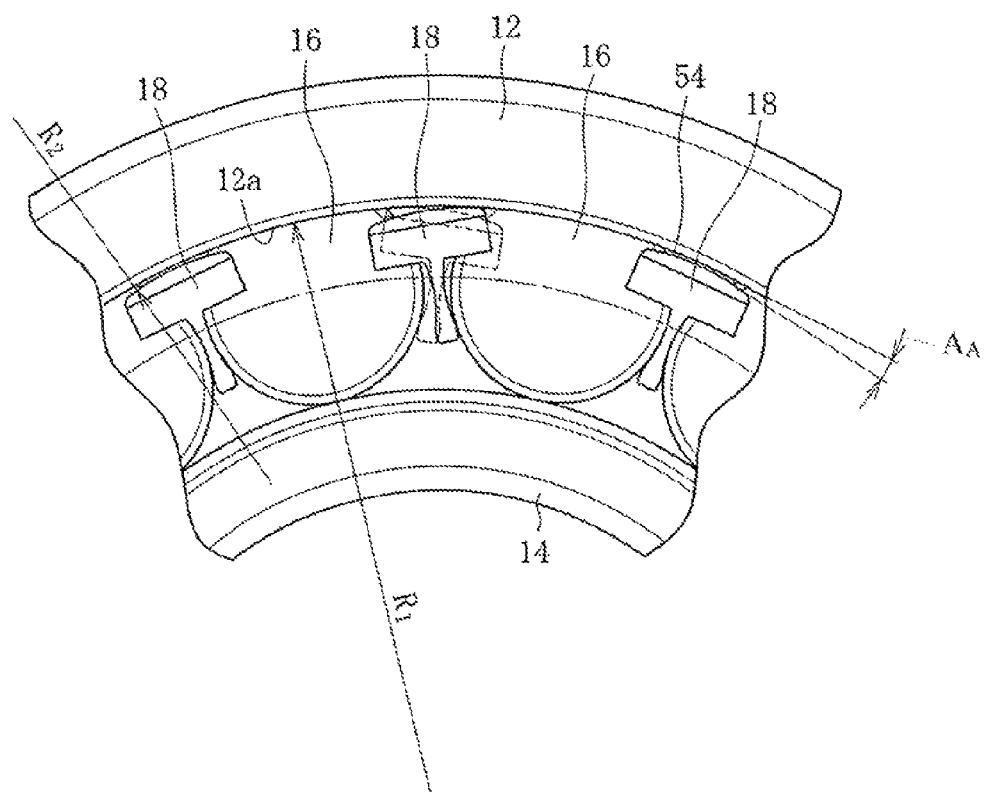
FIG. 17 is a partial side view of the roller bearing of FIG. 15.

Preferably, the radius of curvature $R_2$ of the guiding surface (convex curved surface) 54 of the spacer 18 falls within the range of $0.3 \times R_1 < R_2 < 0.6 \times R_1$, where $R_1$ is the radius of curvature of the inner surface of the flange 12a of the outer ring 12. FIG. 17 shows the behavior of a spacer 18 located adjacent to the circumferential clearance. By adjusting the radius of curvature $R_2$ of the guiding surface 54 within the above range, the guiding surface 54 of the spacer 18 is allowed to come into contact with the inner surface of the flange 12a of the outer ring 12 even when the posture of the spacer 18 is disturbed. The reason that the upper limit is set to $0.6 \times R_1$ is to avoid edge contact on the guiding surface 54 even when the behavior of the spacers 18 is disturbed so that the wedge film effect is generated. In the roller bearing of this type, the behavior of the spacer 18 located adjacent to the circumferential clearance is unstable, as shown by the chain double-dashed line in FIG. 17. Specifically, since the spacer 18 released from the rolling contact surfaces of the adjacent rollers 16 can move and rotate within the circumferential clearance, the approach angle (wedge angle) $A_4$ of the guiding surface 54 is always constant. Therefore, when the radius of curvature $R_2$ of the guiding surface (convex curved surface) of the spacer 18 is too large, or when the approach angle (wedge angle) $A_4$ is too small, the problems that the end portion of the extended portion 18a comes into edge-contact with the inner surface of the flange of the outer ring and that the wedge film effect is not obtained may occur depending on the behavior of the spacer 18. The reason that the lower limit is set to $0.3 \times R_1$ is to ensure the load capacity of the oil film due to the wedge film effect. When the radius of curvature of the guiding surface (convex curved surface) of the spacer 18 is too small, or when the approach angle (wedge angle) $A_4$ is too large, the load capacity of the oil film, which is obtained by the wedge film effect, is reduced.

Figure 18:
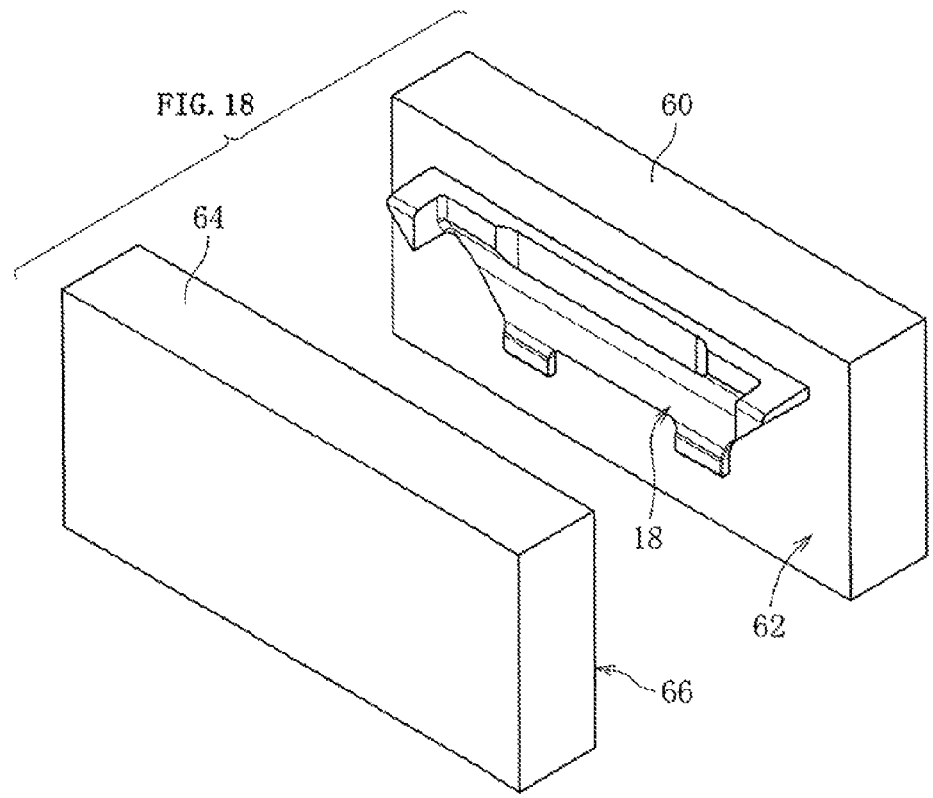
FIG. 18 is a perspective view of a mold-releasing process of a spacer.

FIG. 18 shows the positions (parting lines) of parting surfaces 62 and 66 of molds 60 and 64, respectively, when the spacer 18 is formed by means of injection molding. As shown in the figure, by providing the parting lines at the center of the width of the guiding surfaces (convex curved surfaces) 54, a spacer shape not having an undercut can be provided.

Figure 19:
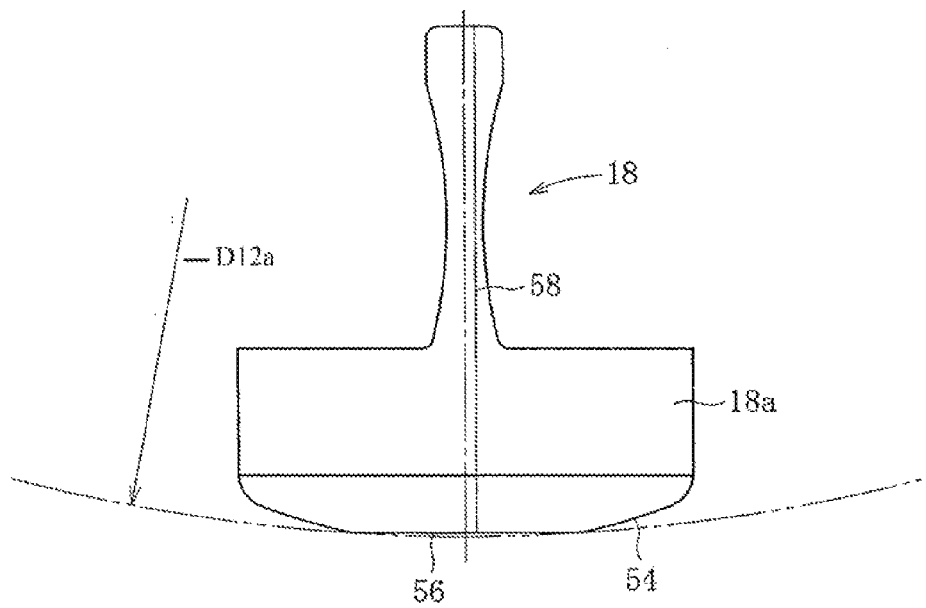
FIG. 19 is an enlarged side view of a spacer.

In an embodiment shown in FIG. 19, a flat portion 56 is provided on the top of the guiding surface (convex curved surface) 54 of the spacer 18. By providing the flat portion 56, a space is formed between the flat portion 56 and the inner surface of the flange of the outer ring, the inner diameter of the flange of the outer ring being labeled D12a. Therefore, the sliding motion between a burr present on a parting line 58 and the inner surface of the flange of the outer ring can be avoided, so that the occurrence of oil film rupture on the guiding surface (convex curved surface) 54 and the formation of wear debris can be suppressed. In order to reduce the cost of the mold and to facilitate the open-close control of the mold during molding, the parting surfaces 62 and 66 of the molds 62 and 66, respectively, may be provided in a plane that divides the shape of the spacer 18 into two right-left symmetric parts which do not have an undercut shape. Specifically, referring to FIG. 19, the parting line is provided in a plane indicated by a chain double-dashed line which passes through the top of the guiding surface (convex curved surface) 54 and divides the width of the spacer 18 into two parts. However, since the parting line may be accompanied by a burr and steps, wear debris may be produced by a sliding motion on the inner surface of the flange of the outer ring, and the parting lines may cause oil film rupture. Accordingly, by providing the flat portion 56 on top of the guiding surface (convex curved surface) 54, the contact between the parting line of the spacer 18 and the inner surface of the flange of the outer ring can be avoided.

Moreover, as shown in FIG. 19, by slightly displacing, within the flat portion 56, the position of the parting line 58 from the center line (chain double-dashed line) that bisects the width of the spacer 18 in the right-left direction, the injection-molded spacer 18 can be reliably released from the molds 60 and 64 while the spacer shape not having an undercut is provided. In order to release the injection-molded product from the mold, the product must adhere to the side of a core plate (movable-side mold) having a protruding pin when the mold is opened. However, when the parting line of the mold is provided in a plane which divides the product into two right-left symmetric parts, the product can adhere to a cavity plate (fixed-side mold) when the mold is opened, so that the problem that the product cannot be released from the mold occurs. In view of the above, by slightly displacing the parting line from the center line toward the cavity plate side so that the contact area between the spacer and the mold is greater on the core plate side than on the cavity plate side, the spacer is allowed to adhere to the core plate side reliably when the mold is opened.

In the embodiments described above, by providing each of the axial ends of the spacer 18 with the extended portion 18a having a surface facing the roller end face, the axial motion of the spacer 18 is restricted. In this manner, the extended portion 18a comes into sliding contact with the end face 16b of the roller 16 during the operation of the bearing. In particular, when the contact surface is flat, the smooth flow of the lubricant on the roller end face 16b is prevented, and the oil film on the roller end faces 16 may be cut by the edge portion of the outline of the contact surface. Consequently, the shortage of the lubricant between the roller end face 16b and the flange surface of the bearing ring occurs. This can results in scores and heat generation. In view of the problems described above, in the modified examples described below, a protruding portion 52 is provided in a portion coming into contact with the roller-end face of the spacer 18, in order to suppress the formation of oil film rupture by allowing the lubricant to smoothly flow around the roller end face. In this manner, the shortage of the lubricant between the roller end face and the flange surface of the bearing ring is reduced, so that a roller bearing in which the occurrence of scoring and heat generation is suppressed is can be provided.

First, in a modified example shown in FIGS. 11A and 11B, the protruding portion 52 having a semi-spherical end portion is provided on a surface of the extended portion 18a of the spacer 18 which faces the roller end face 16b. In this case, the spacer 18 makes contact with the roller end face 16b such that the end portion of the protruding portion 52 comes into point contact therewith. Moreover, a space is formed around the protruding portion 52, and therefore the lubricant is allowed to flow smoothly, so that the occurrence of oil film rupture can be suppressed.

Figure 12:
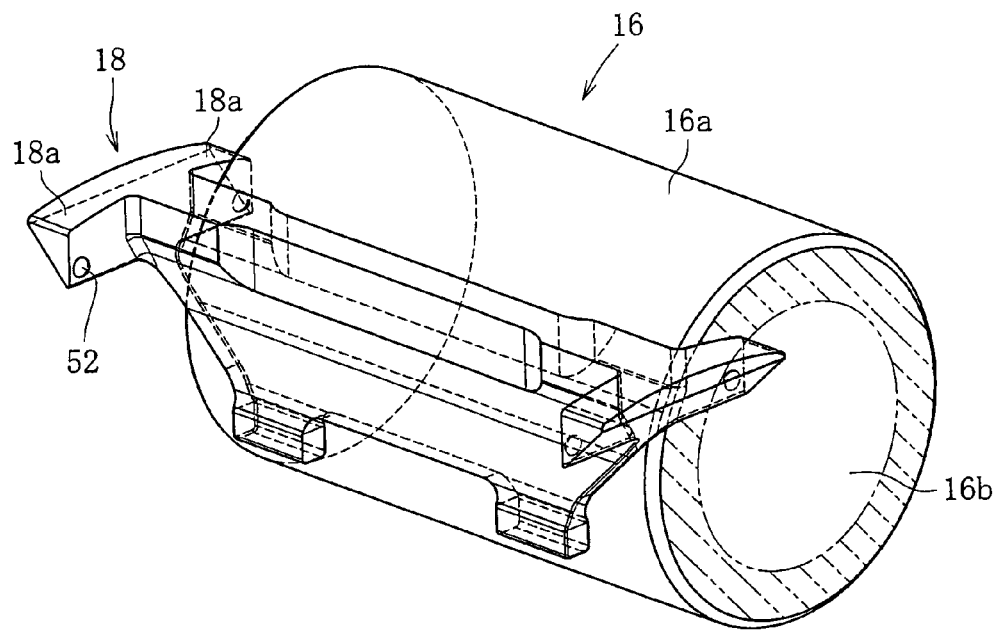
FIG. 12 is a perspective view illustrating another modified example of the spacer.

In a modified example shown in FIG. 12, the protruding portion 52 is provided in a portion corresponding to an area of the roller end face 16b excluding the area (diagonally shaded area) coming into contact with the flange surface of the bearing ring, i.e., is provided in a portion close to the center of the roller end face 16b.

Figure 13:
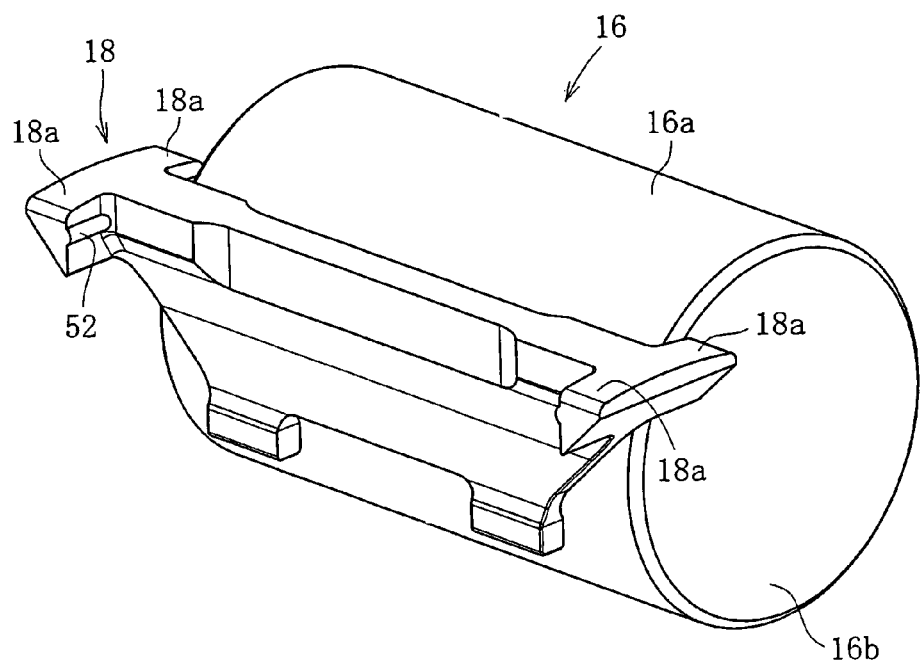
FIG. 13 is a perspective view illustrating still another modified example of the spacer.
Figure 14:
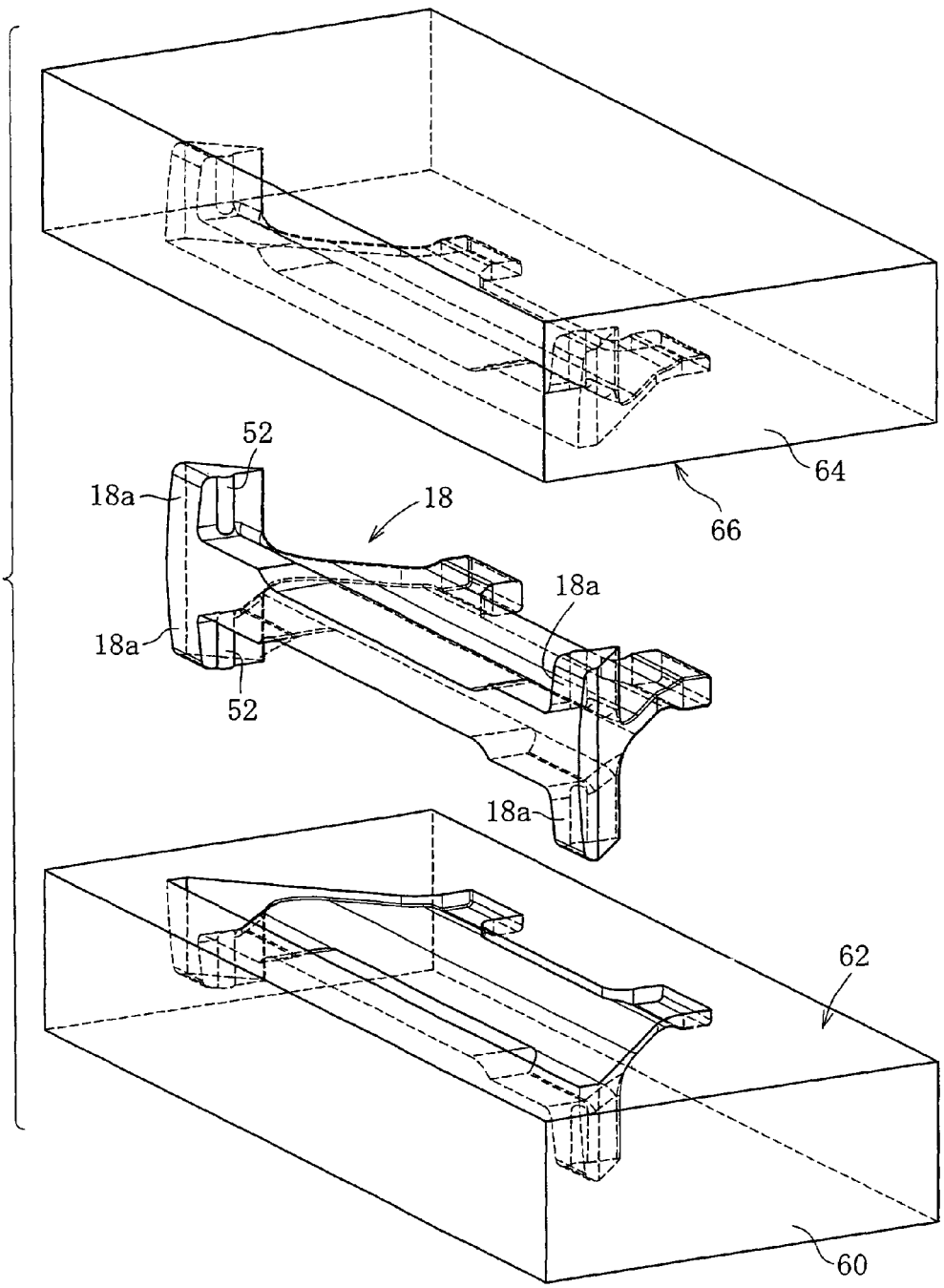
FIG. 14 is an exploded perspective view of the spacer shown in FIG. 8 and a mold.

In a modified example shown in FIG. 13, the invention is applied to a resin-made spacer produced by injection molding. The protruding portion 52 is formed into a semi-cylindrical shape having a substantially semi-circular cross-section, and the lengthwise direction of the protruding portion 52 extends perpendicular to the parting surfaces of molds for molding. In this case, as shown in FIG. 14, the spacer 18 can be easily removed from the upper mold 64 and the lower mold 60 by separating the molds in one direction, i.e., in the vertical direction in the figure. In FIG. 14, the parting surfaces of the upper and lower molds 64 and 60 are indicated by reference numerals 66 and 62, respectively.

The protruding portion 52 may be provided in one or more positions. Alternatively, the entire area of a surface of the extended portion 18a which faces the roller end face 16b may be crowned and may serve as the protruding portion 52.

Figure 22:
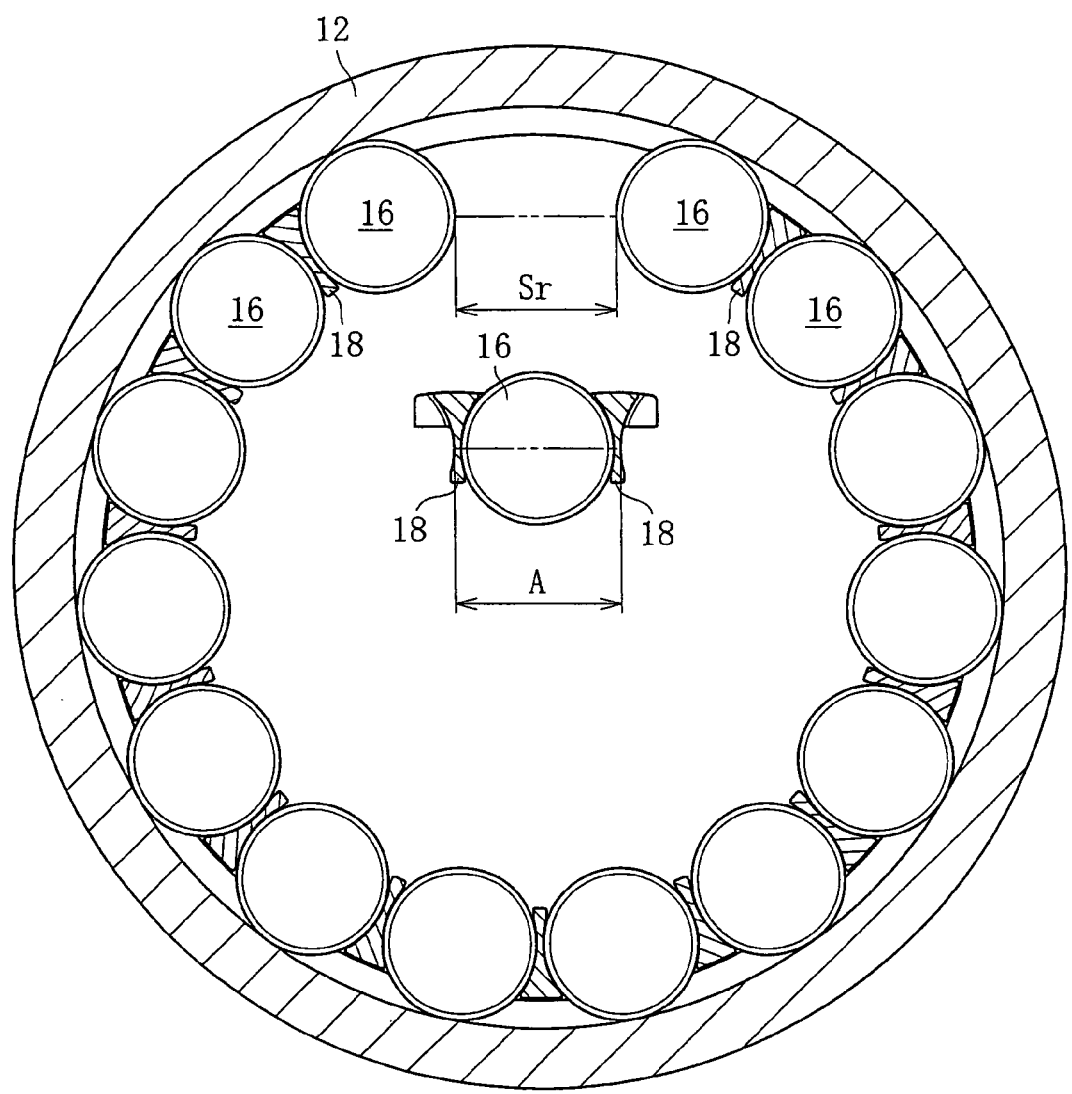
FIG. 22 is a cross-sectional view illustrating another embodiment of the bearing.

An embodiment shown in FIG. 22 is a cylindrical roller bearing in which the keystone effect is exerted by the cylindrical rollers 16 and the spacers 18, and therefore the inner ring is omitted. The outer surface of a shaft is used in place of the raceway surface of the inner ring. In FIG. 22, reference symbol Sr represents the gap between the rollers before the last cylindrical roller 16 and a pair of the spacers 18 are pressed thereinto, and reference symbol A represents the sum of the wall thicknesses of the cylindrical roller 16 and the pair of the spacers 18. The dimensions of the last cylindrical roller 16 and the pair of the spacers 18 are designed such that the relation Sr<A holds, and they are pressed into the gap. In this case, the entire arrangement of the rollers does not drop from the outer ring to the radially inner side (the keystone effect). In this cylindrical roller bearing, the circumferential clearance (see FIG. 1) can be easily adjusted by changing a combination of two or more types of spacers having different wall thicknesses which are produced in advance (matching). Therefore, the keystone can be established without severely managing the roller pitch diameter and the roller diameter.

Figure 23B:
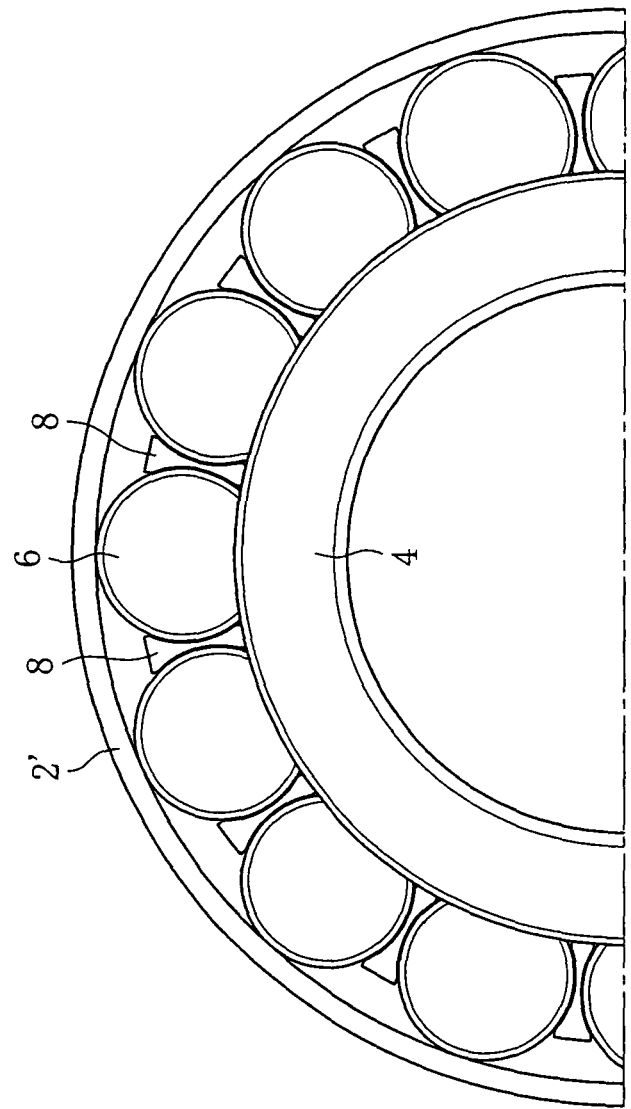
FIG. 23B is a side view of FIG. 23A.
Figure 23A:
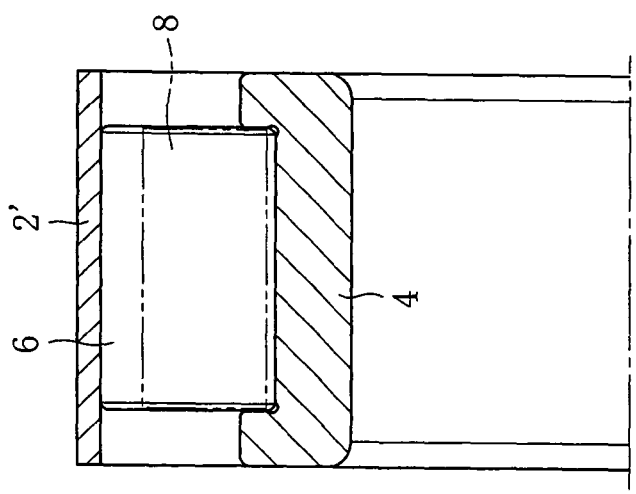
FIG. 23A is a cross-sectional view illustrating a state in which a sleeve for preventing rollers from falling off is used.

Meanwhile, in a general bearing provided with a cage, its rollers are restricted on the inner or outer ring by the cage. Therefore, the rollers do not fall off even when one of the bearing rings is removed. However, as in a full complement bearing, in a bearing having spacers interposed between the rollers, the rollers fall off when one of the bearing rings is removed, so that the handleability is not good. As the measure for this, a method is known in which the keystone effect is exerted as described above to prevent the rollers and spacers from falling off. However, in order to exert the keystone effect, the circumcircle of the rollers must be constrained, so that the outer ring cannot be removed. Hence, when the bearing is attached to an actual machine, an assembly of the inner ring and rollers (sub-assembly) cannot be separated from the outer ring, so that the handleability is not good. Furthermore, a method is known in which a sleeve 2' shown in FIGS. 23A and 23B is used in place of the outer ring to prevent rollers 6 and spacers 8 from falling off. However, this results in an increase in the number of the components, and also the handleability is not good.

In view of this, in a roller bearing having spacers interposed between the rollers, the end faces of each of the rollers may be constrained by the spacers to suppress the outward expansion of the rollers, as described in the following embodiments. In this manner, a bearing can be provided in which the rollers and spacers do not fall off the inner ring even when the outer ring is removed and which has improved handleability and improved mountability.

Figure 24:
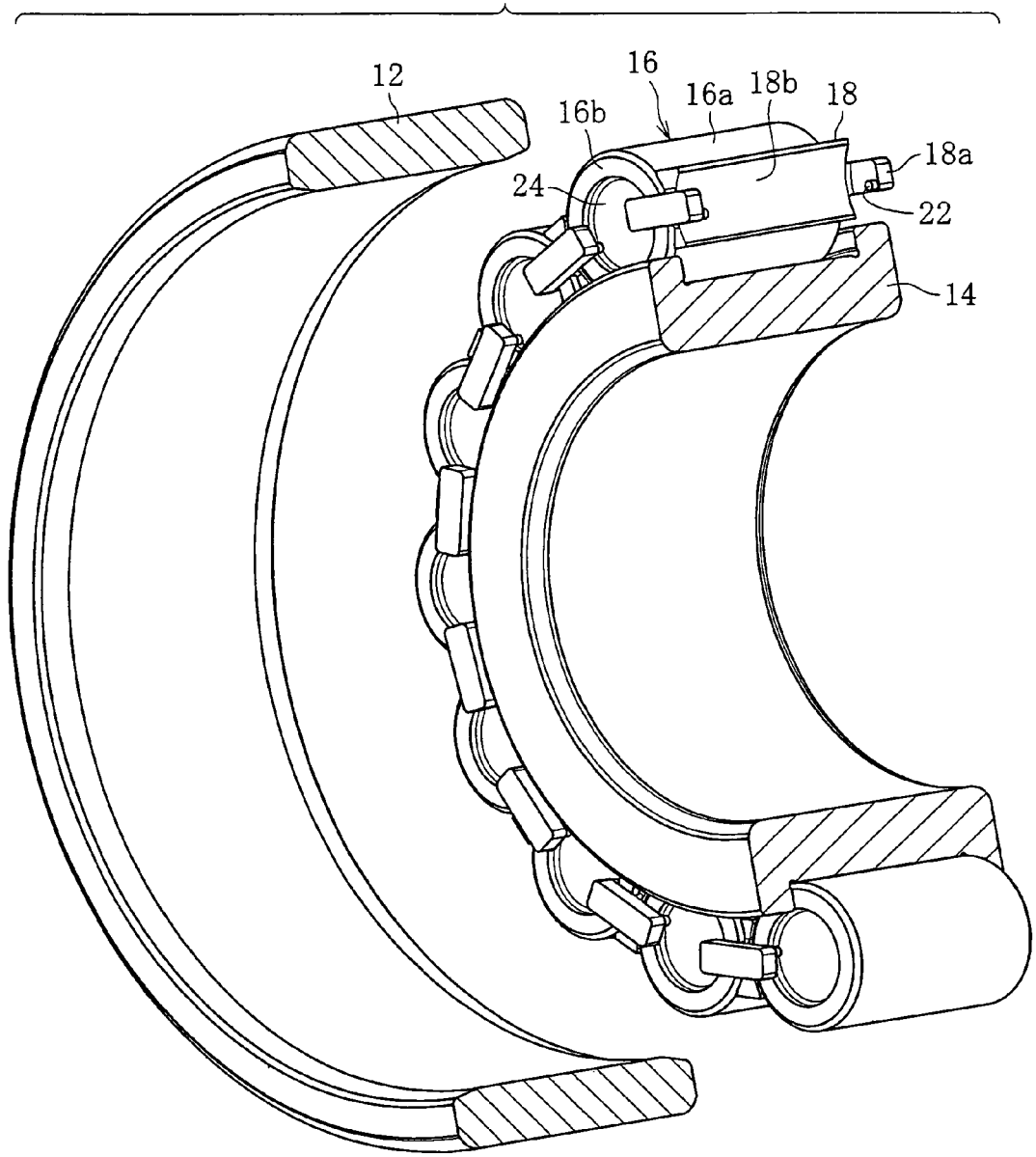
FIG. 24 is an exploded perspective view illustrating a roller bearing of another embodiment of this invention.
Figure 25A:
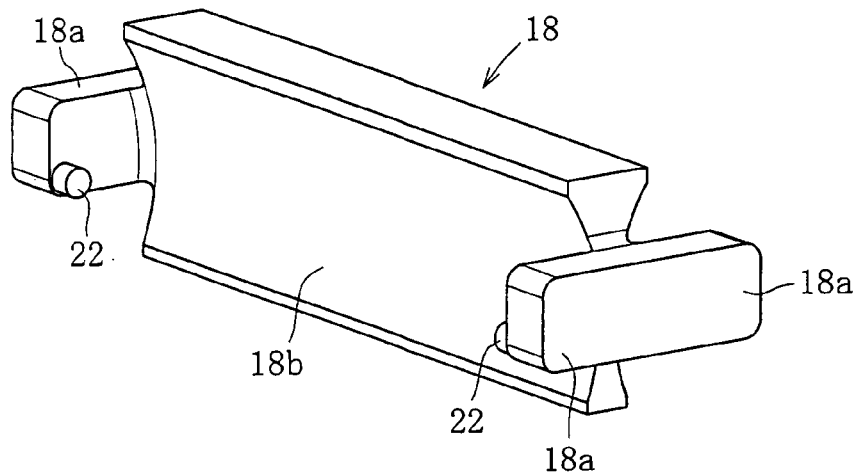
FIG. 25A is a perspective view of a spacer in FIG. 24.

First, in an embodiment shown in FIGS. 24 and 25A, a protruding portion 22 protruding toward the roller end face 16b is provided in each of the extended portions 18a of each of the spacers 18. In addition, a recessed portion 24 is formed in each of the roller end faces 16b, and the protruding portion 22 is placed into the recessed portion 24. As described above, adjacent rollers 16 are connected to each other through the extended portions 18a of the spacers 18. In this manner, the outward expansion of the rollers 16 can be suppressed, so that the rollers 16 and the spacers 18 are prevented from falling off the inner ring 14. Therefore, the rollers 16 and the spacers 18 are prevented from falling off when the outer ring 12 is removed.

Figure 26:
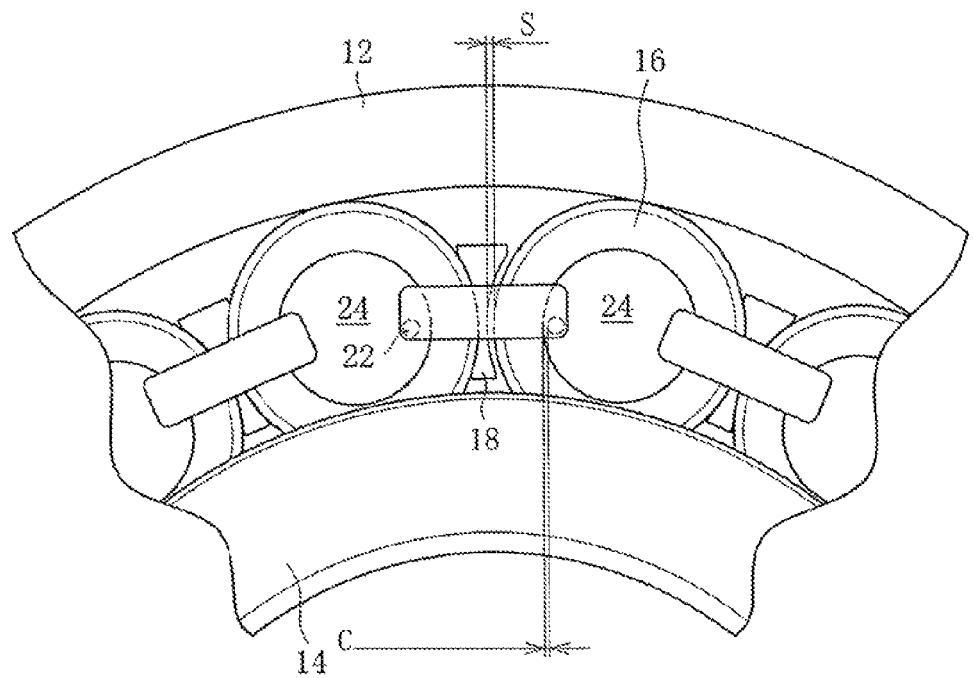
FIG. 26 is a partial side view of the roller bearing of FIG. 24.

As shown in FIG. 26, the protruding portion 22 and the recessed portion 24 are arranged so as not to interfere with each other during operation of the bearing with a clearance C. In this manner, tensile stress is not exerted on the spacers 18. The spacers 18 have a slight degree of motional flexibility in the circumferential and radial directions of the bearing, and the degrees of the motional flexibility are determined mainly by the size of the circumferential clearance S. Therefore, by adjusting the positional relationship between the protruding portion 22 and the recessed portion 24 in consideration of the degree of motional flexibility, the phenomenon that the spacer 18 is pulled by the adjacent rollers 16 on both sides thereof can be avoided.

Figure 27:
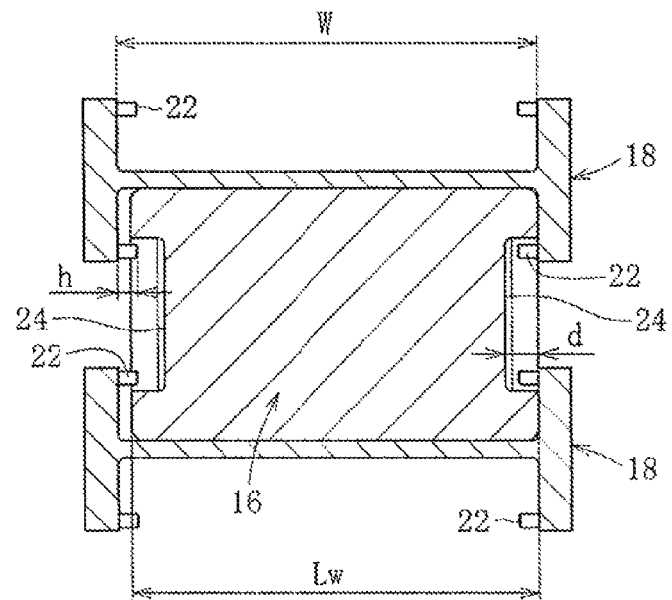
FIG. 27 is a cross-sectional view illustrating the relationship between a roller and spacers and including the axis line of the roller.

As shown in FIG. 27, wear of the end portion of the protruding portion can be avoided by adjusting the height h of the protruding portion 22 within the range of W−Lw<h<d, where Lw is the length of the roller 16, d is the depth of the recessed portion 24, and W is the distance between the extended portions 18a. Specifically, by restricting the axial motion of the spacers 18 by the contact between the roller end face 16b and the extended portion 18a, the contact between the end portion of the protruding portion 22 and the bottom surface of the recessed portion 24 can be avoided.

Figure 25B:
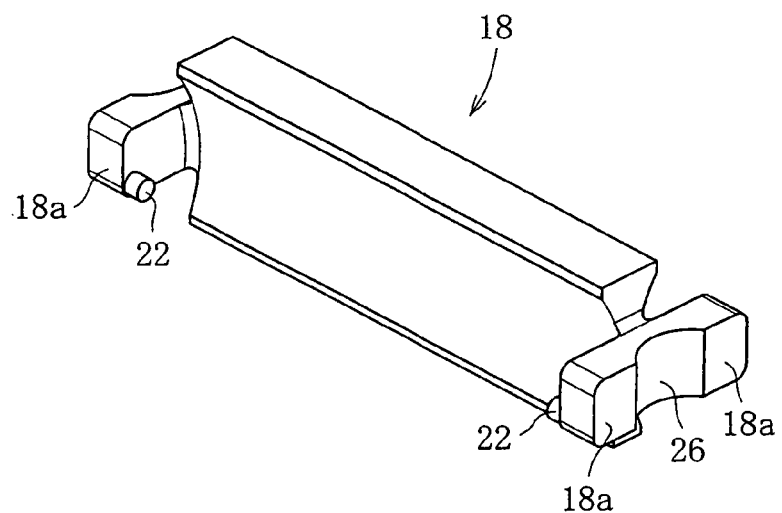
FIG. 25B is a perspective view illustrating a modified example of the spacer of FIG. 25A.
Figure 25C:
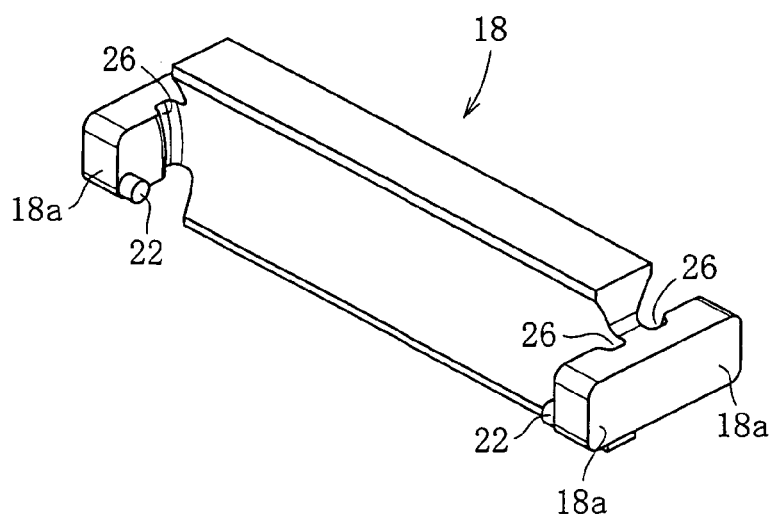
FIG. 25C is a perspective view illustrating another modified example of the spacer of FIG. 25A.

In order to place the protruding portion 22 of the spacer 18 into the recessed portion 24 of the roller end face, the elastic deformation of the extended portion 18 is utilized. Therefore, when a thin-walled portion 26 is provided in the base portion of each of the extended portions 18a as shown in FIGS. 25B and 25C, the stiffness of the base portion of the extended portion is lowered. Hence, the extended portion 18a is easily deformed elastically, so that the ease of assembling the bearing is improved. FIG. 25B shows an example in which the outer side of the extended portion 18a is cut away, and FIG. 25C shows an example in which the inner side of the extended portion 18a is cut away.

Figure 28:
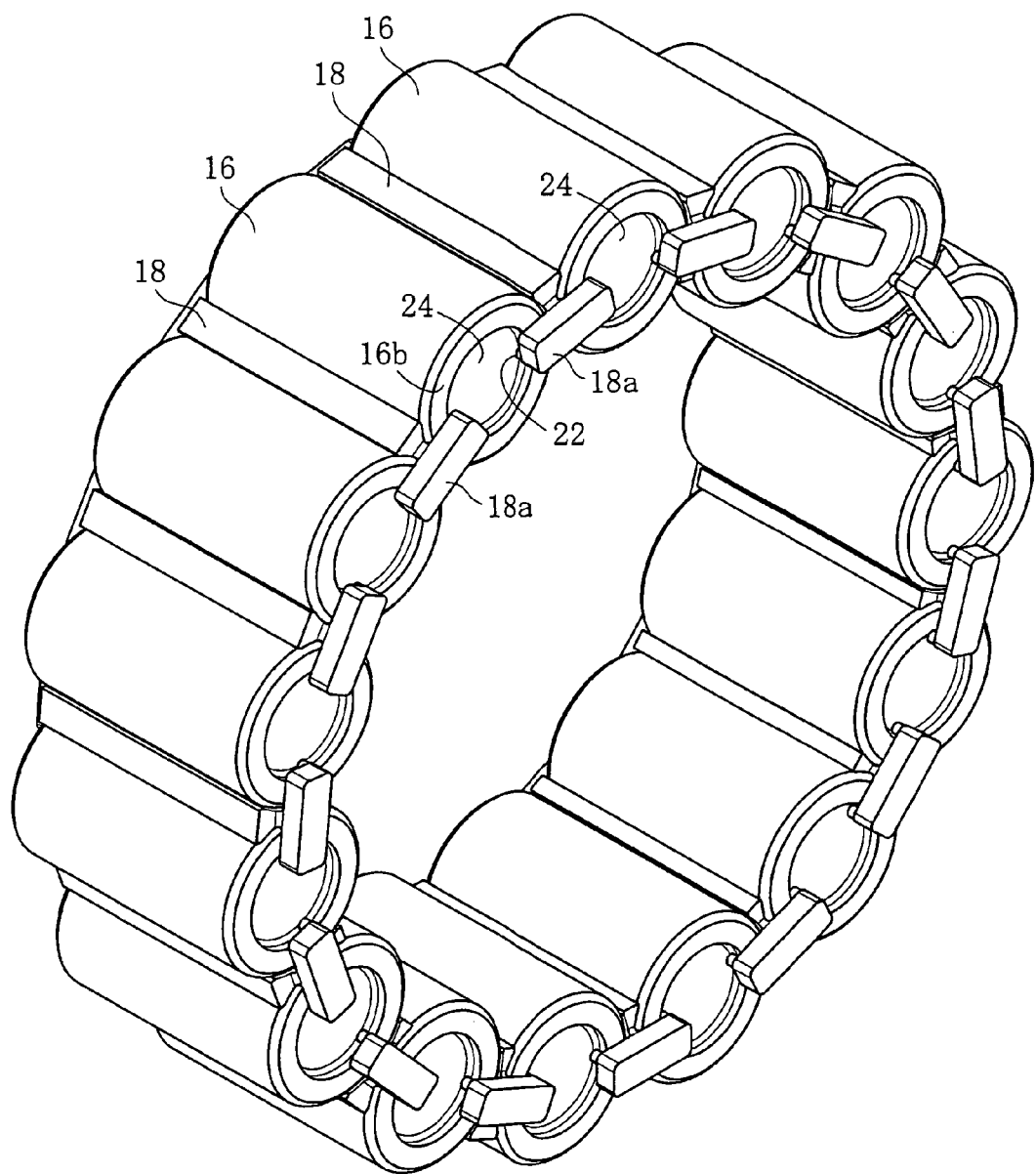
FIG. 28 is a perspective view illustrating another embodiment of the bearing.

An embodiment shown in FIG. 28 is a cylindrical roller bearing of a so-called separator & roller type in which inner and outer rings are omitted. The outer surface of a shaft is used as the raceway surface of the inner ring, and the inner surface of a housing is used as the raceway surface of the outer ring. As in the above-described embodiment, the protruding portion 22 formed in the extended portion 18a of the spacer 18 is placed into the recessed portion 24 formed in the roller end face 16b. Hence, by connecting adjacent cylindrical rollers 16 through the extended portions 18a of the spacers 18, the entire arrangement of the rollers forms a continuous chain-like form. Therefore, the bearing is easy to handle and can be easily attached to an apparatus even though the bearing does not have inner and outer rings.

Figure 29:
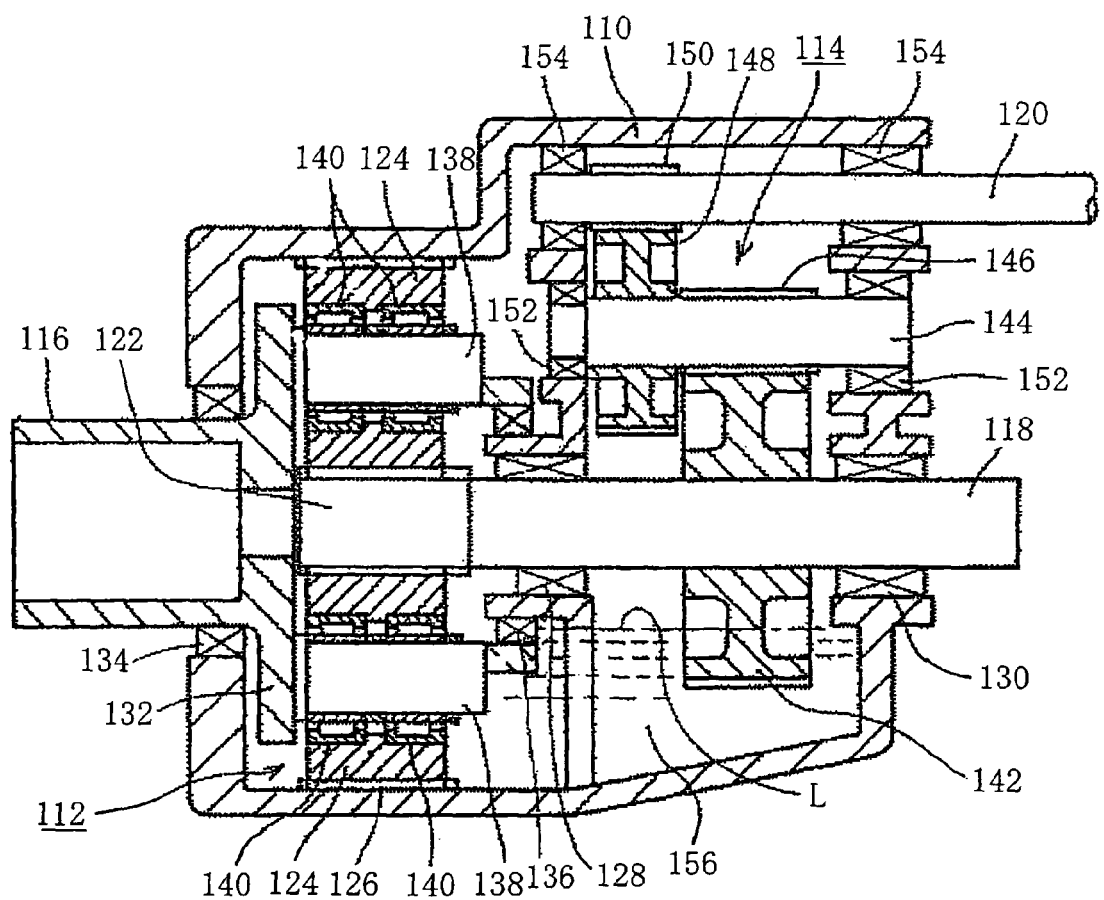
FIG. 29 is a vertical cross-sectional view illustrating an embodiment of a planetary gear system.
Figure 30:
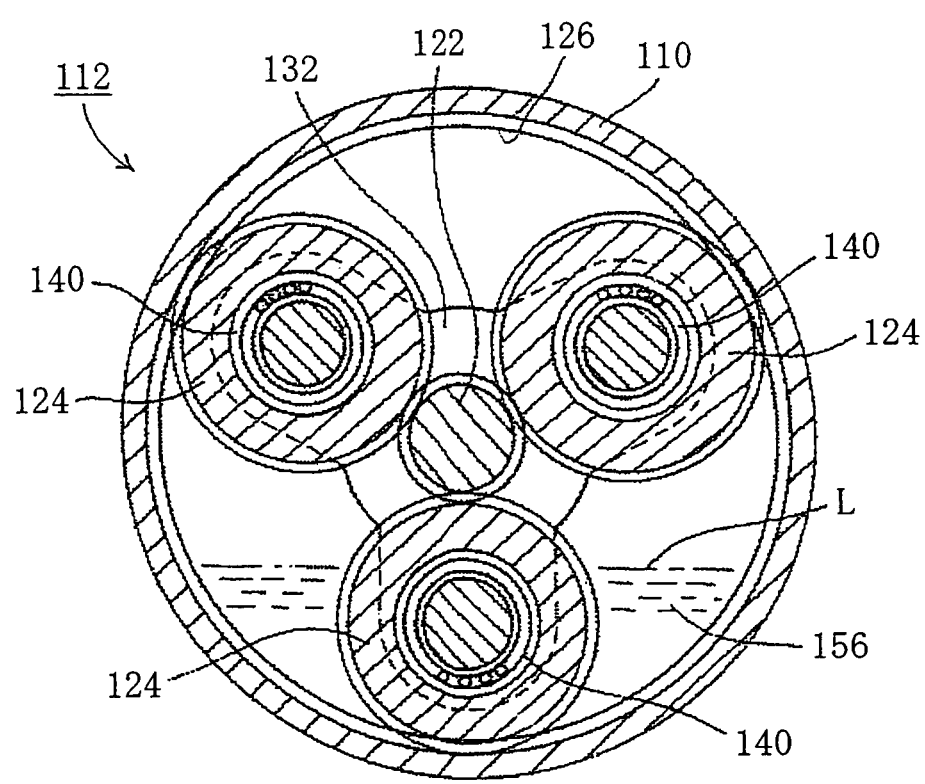
FIG. 30 is a horizontal cross-sectional view of the planetary gear system of FIG. 29.

Examples of the application of the roller bearings described above include a planetary gear system used for a step-up gear for a wind turbine generator. Figs. 29 and 30 show a step-up gear for a wind turbine generator which is provided with a planetary gear system. This step-up gear includes a planetary gear system 112 and a secondary step-up gear 114 which are disposed in a common casing 110. The planetary gear system 112 plays a role in increasing the rotational speed of an input shaft 116 and transmitting the rotation to a low speed shaft 118. The secondary step-up gear 114 plays a role in further increasing the rotational speed of the low speed shaft 118 and transmitting the rotation to an output shaft 120. The input shaft 116 is connected to a main shaft (not shown) or the like of a wind turbine (not shown), and the output shaft 120 is connected to a power generator (not shown).

The planetary gear system 112 is composed of a gear train including a sun gear 122, planet gears 124, and an internal gear 126. Each of the planet gears 124 is engaged with both the sun gear 122 and the internal gear 126. The internal gear 126 may be formed directly on the casing 110 or may be formed by securing a separate body to the casing 110. The sun gear 122 is a member that serves as the output shaft of the planetary gear system 112 and is attached to the low speed shaft 118. The low speed shaft 118 is supported by bearings 128 and 130 and is rotatable relative to the casing 110.

The planet gears 124 are carried by a carrier 132. The carrier 132 is a member that serves as the input unit of the planetary gear system 112 and is formed integrally with or integrally connected to the input shaft 116. The carrier 132 is supported by bearings 134 and 136 at the portion of the input shaft 116 and is rotatable relative to the casing 110. A plurality of planet shafts. 138 (three in FIG. 30) are disposed along the circumferential direction of the carrier 132, and the planet gears 124 are rotatably supported by the respective planet shafts 138 through bearings 140. In the example shown in the figures, two bearings 140 are arranged for each of the planet gears 124, but only one bearing 140 may be used.

The secondary step-up gear 114 is composed of a gear train. In the example shown in the figures, a gear 142 secured to the low speed shaft 118 is engaged with a minor diameter-side gear 146 of an intermediate shaft 144, and a major diameter-side gear 148 provided on the intermediate shaft 144 is engaged with a gear 150 of the output shaft 120. The intermediate shaft 144 and the output shaft 120 are supported by bearings 152 and 154, respectively, and are rotatable relative to the casing 110.

The lower portion of the casing 110 forms an oil bath 156 for lubricating oil, and the oil level L of the oil bath 156 is set to a height allowing the bearings 140 supporting the planet gears 124 to be immersed in and withdrawn from the oil bath 156 by the rotation of the carrier 132.

The operation of the above configuration will be described. As the input shaft 116 rotates, the carrier 132 integrated with the input shaft 116 rotates, and the planet gears 124 carried by the carrier 132 moves around the sun gear. At this time, each of the planet gears 124 moves around the sun gear 122 while engaged with the fixed internal gear 126, whereby the planet gears 124 rotate. Each of the rotating planet gears 124 moving around the sun gear 122 is engaged with the sun gear 122, so that the sun gear 122 rotates at a higher speed than the input shaft 116. The sun gear 122 serving as the output unit of the planetary gear system 112 is provided on the low speed shaft 118 of the secondary step-up gear 114. The rotational speed of the sun gear 122 is increased by the secondary step-up gear 114, and the rotation is transmitted to the output shaft 120. As described above, the speed of the rotation of the main shaft of the wind turbine (not shown) which is inputted to the input shaft 116 is increased significantly by the planetary gear system 112 and the secondary step-up gear 120, and the rotation is transmitted to the output shaft 120. Hence, high speed rotation capable of power generation is obtained from the output shaft 120.

Since the initial capital investment for a wind turbine generator is high, the amortization period often exceeds 10 years. In addition to this, a wind turbine generator is placed at a high elevation, so that the maintenance thereof is difficult. Therefore, the components of the wind turbine generator are required to have a long life of about 20 years.

This is also the case for a planetary gear system incorporated for increasing the rotational speed of a rotor (see Patent Document 2: Japanese Patent Application Laid-Open No. 2005-36880). In particular, a bearing used in the above system, or the supporting bearing for the planetary gear, is required to have a high reliability and a long life. Moreover, in recent years, the size of wind turbines has been increasing in order to improve the efficiency of power generation. On the other hand, in order to reduce load on a tower, there is an increasing demand to reduce the weight and size of a nacelle. Accordingly, the planetary gear system is also required to be compact.

Accordingly, a compact bearing with high rated load is required to be used as the bearing for the planetary gear system. Since the rotational speed of the system is relatively low, a full complement bearing is often used in which a cage is omitted and a larger number of rollers are incorporated thereinto. Moreover, since the planetary gear can easily deform during operation because of its structure, it is desirable to use a high stiffness bearing having a large number of rollers as in a full complement bearing.

However, in a full complement bearing, the contacting portions of adjacent rollers are rotationally moved in opposite directions. Therefore, the rotation of the rollers is likely to be inhibited, and surface damage such as scoring and smearing tends to be generated. In particular, under low rotational speed conditions as in those in a planetary gear system, the oil film of a lubricant is not easily formed in each contacting portion of the bearing. Therefore, the damage described above is generated more often.

Accordingly, there is a demand for a planetary gear system which can be operated for a long time without maintenance by using, as the supporting bearing for the planetary gear, a compact roller bearing having high stiffness and high rated load and less likely to suffer from surface damage.

Any of the roller bearings of the embodiments described above can be used as the bearing 140 supporting each of the planet gears 124. All the roller bearings have the spacers interposed between adjacent rollers, and the extended portions facing the roller end faces are provided at both axial ends of each of the spacers.

The above spacers are separated and independent from each other, so that tensile stress, which is generated in the case of conventional retainers, is not exerted on the spacers. Therefore, a larger number of rollers can be incorporated in the bearing, and a compact roller bearing having high rated load and high stiffness can be provided.

Moreover, in contrast to a full complement bearing, the contact between adjacent rollers can be avoided, and the portions of rollers which rotationally move in opposite directions do not slide with each other. Therefore, the rotation of each roller is less inhibited, and surface damage such as scoring and smearing can be reduced significantly.

Furthermore, by providing the extended portion facing the roller-end face at both axial ends of the spacer, the axial motion of the spacer can be restricted by the extended portions and the roller-end faces, and the radial motion can be restricted by the rolling contact surfaces of the rollers, the outer surface of the flange of the inner ring, or the inner surface of the flange of the outer ring.

Specifically, the raceway surfaces of the inner and outer rings and the side surfaces of the flanges are not used as means for restricting the motion of the spacers. Therefore, the spacers need not be interposed over a wide area between adjacent rollers, and the stirring resistance of the lubricating oil can be suppressed. In addition, the lubricating oil is not prevented from flowing smoothly around the rolling surfaces.

Moreover, when the spacers are guided by the outer surfaces of the flanges of the inner ring or the inner surface of the flanges of the outer ring, the extended portions exert the effect of increasing the guiding area thereof. Hence, an oil film is formed easily on the guiding surface.

In the roller bearing described in Patent Document 1, the motion of the spacers is restricted by the raceway surfaces of the inner and outer rings and the side surfaces of the flanges. Therefore, the use of interposed spacers of the same size as the size of the radial cross-section of the rollers is inevitable, and accordingly the stirring resistance of the lubricating oil tends to be large. Moreover, since the spacers are brought into sliding contact with the raceway surface of the inner or outer ring, the smooth formation of the oil film on the rolling surfaces may be disturbed.

In the above roller bearings used in the planetary gear system, the outer ring can be omitted, and the inner surface of a gear can be used in place of the raceway surface of the outer ring. By omitting the outer ring, the planetary gear system can be made compact without loosing the effects described above, and the stiffness of the shafts and housing can be improved. Moreover, a higher rated load roller bearing may be used which has a roller diameter increased by an amount corresponding to the space of the omitted outer ring, and this can contribute to extending the life of the planetary gear system. Note that when the bearing itself is handled, the rollers can be prevented from falling off by restricting the circumference of the circumcircle of the rollers using an annular member, a tightening band, or the like in place of the omitted outer ring.

The above roller bearings used in the planetary gear system may be roller bearings which include, in the extended portions, the protruding portions protruding toward the roller end faces and further include the recessed portions in the roller end faces, in which the protruding portions are placed into the respective recessed portions, and in which the outer ring is omitted. Furthermore, the inner surface of a gear may be used in place of the raceway surface of the outer ring. In the roller bearing having the configuration described above, the outward expansion of the rollers can be suppressed by connecting the side surfaces of the rollers through the extended portions of the spacers. In other words, even when the outer ring is omitted, the rollers and spacers do not fall off the inner ring, and therefore the handleability of the bearing can be improved.

Note that by arranging the protruding portions and the recessed portions in the roller end faces so as not to interfere with each other, tensile stress is not exerted on the spacers during operation. The spacers have a slight degree of motional flexibility in the circumferential and radial directions of the bearing, and the degree of the motional flexibility is determined mainly by the size of the circumferential clearance. Specifically, by adjusting the positional relationship between the protruding portion and the recessed portion in the roller end face in consideration of the degree of motional flexibility, the phenomenon that the spacer is pulled by adjacent rollers on both sides thereof can be avoided.

The above roller bearings used in the planetary gear system may be roller bearings of a separator & roller type which include, in the extended portions of the spacers, the protruding portions protruding toward the roller end faces and include the recessed portions in the roller end faces and in which the protruding portions are placed into the respective recessed portions. The outer surface of the planet shaft may be used in place of the raceway surface of the inner ring, and the inner surface of a gear may be used in place of the raceway surface of the outer ring. The roller bearing having the configuration described above can be handled in a chain-like shape by connecting the roller end faces to each other through the extended portions of the spacers and therefore can be easily attached to the system even though the inner and outer rings are not provided. Specifically, the above roller bearing can have a form of a separator & roller type in which bearing rings are omitted. Therefore, the size of the planetary gear system can be reduced, and the stiffness of the shaft and housing can be improved. Alternatively, a higher rated load roller bearing may be used which has a roller diameter increased by an amount corresponding to the space of the omitted bearing rings, and this can contribute to extending the life of the planetary gear system.

The connecting portions of the separator & roller described above are formed by placing the protruding portions of the spacers into the recessed portions of the roller end faces by elastically deforming the spacers. Therefore, for example, after one of the connecting portions is separated and the bearing is wound on a planet shaft serving as a winding target, the separated connecting portion may be reconnected. In addition, by providing a slit in the base portions of the extended portions of the spacers, the ease of assembling the bearing is improved.

The above roller bearings used in the planetary gear system may be roller bearings in which the keystone effect is exerted by the rollers and spacers, whereby the inner ring is omitted. The outer surface of the planet shaft may be used in place of the raceway surface of the inner ring. In the roller bearing having the configuration described above, a mechanism for preventing the rollers and spacers from falling off even when the inner ring is removed can be formed by exerting the keystone effect by the rollers and spacers. In other words, the inner ring can be omitted from the above roller bearing. Hence, the size of the planetary gear system can be reduced, and the stiffness of the shaft and housing can be improved. Alternatively, a higher rated load roller bearing may be used which has a roller diameter increased by an amount corresponding to the space of the omitted inner ring, and this can contribute to extending the life of the planetary gear system.

In the above roller bearing, the circumferential clearance can be easily adjusted by changing the numbers of two or more spacers used in combination (matching). The spacers have different wall thicknesses and are produced in advance. Therefore, the keystone can be established without severely managing the pitch diameter or the roller and the roller diameter. In other words, the keystone effect can be obtained at lower cost than a full complement bearing.

The spacers of the above roller bearing used in the planetary gear system may include recessed portions for the purpose of retaining lubricating oil. The recessed portions include closed-end recessed portions and through holes. By employing the configuration described above, the lubricating oil can be retained in the recessed portions, and this can contribute to extending the life of the planetary gear system.

Most of lubrication methods for planetary gear systems are bath lubrication. The planet gears are immersed in an oil bath after being located at the bottom due to their revolution, and the lubricating oil is supplied thereto. Therefore, at some point, there exists a bearing not immersed in the lubricating oil. A wind turbine generator may stop its operation for a long period of time according to the conditions of wind. Hence, in the planetary gear, the lubricating oil in the bearing not immersed in the oil bath may flow down, and therefore most of the lubricating oil may be lost. If the operation is restarted from the above state when the conditions of wind are changed, lubrication failure may occur in the bearing, and smooth rotation can be disturbed. This results in the reduction in the efficiency of wind power generation and also prevents the extension of the life of the bearing.

Generally, it is desirable to use as the material for the spacers a synthetic resin having self-lubricating properties, a sintered alloy capable of being impregnated with lubricating oil in its pores, or the like.

The invention claimed is:

1. A roller bearing comprising:
an inner ring raceway surface;
an outer ring raceway surface;
a plurality of rollers interposed between the inner ring raceway surface and the outer ring raceway surface; and
a plurality of spacers, each of the spacers being provided between an adjacent pair of the rollers, and each of the spacers having at both axial ends thereof extended portions each facing end faces of the adjacent pair of the rollers,
wherein each of the end faces of the rollers has a recessed portion formed therein and each of the extended portions of the spacers has a protruding portion that protrudes toward a corresponding one of the end faces of the rollers and extends into the recessed portion,
wherein two of the protruding portions extend into each of the recessed portions,
wherein the protruding portions and the recessed portions are arranged so as not to contact each other once mounted in the roller bearing, and
wherein the outer ring raceway surface is a single continuous surface having a constant width and that forms a complete circle.

2. The roller bearing of claim 1, wherein a circumferential clearance S falls within a range of $0.001 \times Dw \times Z \leq S \leq 0.01 \times Dw \times Z$, where $Dw$ is a diameter of the rollers, and $Z$ is a number of the rollers.

3. The roller bearing of claim 1, wherein a maximum value L of a length of the extended portions falls within a range of $0.2 \times Dw \leq L \leq 0.9 \times Dw$, where $Dw$ is a diameter of the rollers.

4. The roller bearing of claim 1, wherein the spacers extend from an inner side of a pitch circle of the rollers to an outer side of the pitch circle and wherein a surface of each of the spacers that faces a rolling contact surface of an adjacent one of the rollers has a concave cross-sectional shape for receiving the rolling contact surface of the roller.

5. The roller bearing of claim 1, wherein each of the spacers is guided by an inner surface of a flange of an outer ring.

6. The roller bearing of claim 1, wherein each of the spacers is guided by an outer surface of a flange of an inner ring.

7. The roller bearing of claim 1, wherein a surface of each of the spacers that comes into contact with a corresponding one of the rollers has an oil groove provided therein.

8. The roller bearing of claim 1, wherein a surface of each of the spacers that comes into contact with a corresponding one of the rollers has a recessed portion for retaining a lubricant provided therein.

9. The roller bearing of claim 1, wherein a surface of each of the spacers has a guiding surface that faces an inner surface of a flange of an outer ring and is formed into a convex shape having a radius of curvature $R_2$ that is less than that of the inner surface of the flange of the outer ring.

10. The roller bearing of claim 9, wherein the radius of curvature $R_2$ of the convex shape falls within a range of $0.3 \times R_1 < R_2 < 0.6 \times R_1$, where $R_1$ is a radius of curvature of the inner surface of the flange of the outer ring.

11. The roller bearing of claim 9, wherein a top portion of the convex shape of each of the spacers has a flat portion and each of the spacers comprises an injection molded resin material.

12. The roller bearing of claim 11, wherein each of the spacers is molded by a pair of molds having parting surfaces that face each other along a plane, the plane passing through a position which is located within the flat portion and is displaced from a center line bisecting a width of the spacer.

13. The roller bearing of claim 1, wherein a surface of each of the spacers has a guiding surface which faces an outer surface of a flange of an inner ring and is formed into a convex shape.

14. The roller bearing of claim 1, wherein each of the protruding portions faces a portion of the corresponding one of the end faces of the rollers excluding a region of the corresponding one of the end faces of the rollers coming into contact with a flange of a bearing ring.

15. The roller bearing of claim 1, wherein the spacers are made of resin and the protruding portions extend perpendicular to a parting surface of a mold.

16. The roller bearing of claim 1, wherein an end portion of each of the protruding portions has a curved surface.

17. The roller bearing of claim 1, wherein a height h of each of the protruding portions falls within a range of $W-Lw<h<d$, where Lw is a length of the rollers, d is a depth of the recessed portion, and W is a distance between the extended portions of the spacers.

18. The roller bearing of claim 1, wherein a base portion of each of the extended portions has a cut-away portion with a thickness that is less than a thickness of a remainder of the respective extended portion.

19. The roller bearing of claim 1, wherein the protruding portions are positioned on the extending portions to be off-centered on their respective extending portions in a direction towards the outer ring raceway surface.

20. The roller bearing of claim 1, wherein a diameter of the recessed portions is greater than one half of a diameter of the end faces of the rollers.

21. The roller bearing of claim 1, wherein each of the recessed portions formed in the end faces of the rollers has a planar bottom surface and the recessed portions of each of the rollers are not formed by a through hole that passes completely through the respective roller.

* * * * *